(12) United States Patent
Price et al.

(10) Patent No.: US 12,495,268 B1
(45) Date of Patent: Dec. 9, 2025

(54) GENERATING AUDIO-BASED MEMORIES WITHIN A NETWORKING SYSTEM

(71) Applicant: Meta Platforms, Inc., Menlo Park, CA (US)

(72) Inventors: Rex Pinegar Price, Cameron Park, CA (US); Lindsey Kishline, Seattle, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 414 days.

(21) Appl. No.: 18/305,800

(22) Filed: Apr. 24, 2023

Related U.S. Application Data

(60) Provisional application No. 63/365,091, filed on May 20, 2022.

(51) Int. Cl.
*H04R 5/00* (2006.01)
*G06F 3/0481* (2022.01)
*G06F 3/04842* (2022.01)
*G06F 3/16* (2006.01)
*G06V 10/70* (2022.01)
*G06V 20/30* (2022.01)
*G06V 20/40* (2022.01)
*G06V 40/10* (2022.01)
*H04S 3/00* (2006.01)
*H04S 7/00* (2006.01)

(52) U.S. Cl.
CPC .......... *H04S 7/303* (2013.01); *G06F 3/0481* (2013.01); *G06F 3/04842* (2013.01); *G06F 3/165* (2013.01); *G06V 10/70* (2022.01); *G06V 20/30* (2022.01); *G06V 20/40* (2022.01); *G06V 40/10* (2022.01); *H04S 3/008* (2013.01); *G06V 2201/10* (2022.01); *H04S 2400/01* (2013.01); *H04S 2400/11* (2013.01)

(58) Field of Classification Search
CPC ...... H04S 7/303; H04S 3/008; H04S 2400/01; H04S 2400/11; G06V 10/70; G06V 40/10; G06V 20/40; G06V 20/30; G06V 2201/10; G06F 3/0481; G06F 3/04842; G06F 3/165
USPC ...................................................... 381/1, 18
See application file for complete search history.

(56) References Cited

U.S. PATENT DOCUMENTS 9,450,907 B2 9/2016 Pridmore et al.
9,754,416 B2 9/2017 Kamhi et al.
(Continued)

*Primary Examiner* — William J Deane, Jr.
(74) *Attorney, Agent, or Firm* — Morgan, Lewis & Bockius LLP

(57) ABSTRACT

Systems, methods, client devices, and non-transitory computer-readable media are disclosed for utilizing mobile devices and/or audio scraping to generate audio memories that are tied to particular events within a networking system. For example, the disclosed systems can identify videos stored within a networking system associated with a particular event or person and generate audio memories from the videos (for a user). In some cases, the disclosed systems can receive a user interaction requesting to create an audio memory and, via a mobile device, capture an audio memory. Subsequently, in one or more embodiments, the disclosed systems can identify stored audio memories that match to an event that corresponds to a user and surface the identified audio memories within a mobile device of the user. Indeed, the disclosed systems can cause the mobile device to play an audio memory from the surfaced audio memories.

20 Claims, 14 Drawing Sheets

(56) References Cited

U.S. PATENT DOCUMENTS

| | | | |
|---|---|---|---|
| 10,645,159 B1* | 5/2020 | Chen | G06Q 50/01 |
| 10,869,154 B2 | 12/2020 | Bruser et al. | |
| 11,086,592 B1 | 8/2021 | Wang | |
| 11,095,947 B2 | 8/2021 | Bentovim et al. | |
| 2011/0283172 A1 | 11/2011 | Berger et al. | |
| 2012/0213490 A1* | 8/2012 | Steiner | G06V 40/168 |
| | | | 386/E9.011 |
| 2013/0218961 A1* | 8/2013 | Ho | G06Q 30/02 |
| | | | 709/204 |
| 2016/0350953 A1* | 12/2016 | Mittelstaedt | H04L 51/043 |
| 2017/0255820 A1* | 9/2017 | Liu | G06F 16/00 |
| 2017/0270180 A1* | 9/2017 | State | G06F 40/169 |
| 2019/0104331 A1* | 4/2019 | Bapna | H04N 21/8455 |
| 2020/0089455 A1 | 3/2020 | Green et al. | |

\* cited by examiner

GENERATING AUDIO-BASED MEMORIES WITHIN A NETWORKING SYSTEM

CROSS-REFERENCE TO RELATED APPLICATIONS

This application claims priority to and the benefit of U.S. Provisional Patent Application No. 63/365,091, filed on May 20, 2022, which is incorporated herein by reference in its entirety.

BACKGROUND

In recent years, mobile devices are increasingly utilized to capture images and videos. Additionally, conventional digital content management systems are also utilized to store and manage the numerous amounts of images and videos. Some conventional systems further identify select videos and images related to a user to present the select videos and images as memories of significant events. However, conventional digital content management systems are often limited to surfacing videos and images (e.g., visual content) that limit the experience of past events within the conventional digital content management systems.

SUMMARY

Embodiments of the present disclosure provide benefits and/or solve one or more of the foregoing or other problems in the art with systems, non-transitory computer-readable media, and methods that utilize mobile devices and/or audio scraping to generate audio memories that are tied to particular events within a networking system. For example, the disclosed systems can identify videos stored within a networking system associated with a particular event or person (e.g., via voice recognition and/or a machine learning) and generate audio memories from the videos (for a user). In some cases, the disclosed systems can receive a user interaction requesting to create an audio memory and, via a mobile device (e.g., a smartphone, augmented reality glasses, tablet), capture an audio memory (e.g., using an audio capture device to capture audio and/or spatial audio). Subsequently, in one or more embodiments, the disclosed systems can identify stored audio memories that match to an event (e.g., a specific date, time, location, and/or user activity) that corresponds to a user and surface the identified audio memories within a mobile device of the user. Indeed, the disclosed systems can cause the mobile device to play an audio memory from the surfaced audio memories (e.g., using audio and/or spatial audio).

BRIEF DESCRIPTION OF THE DRAWINGS

The detailed description is described with reference to the accompanying drawings in which.

DETAILED DESCRIPTION

Figure 1:
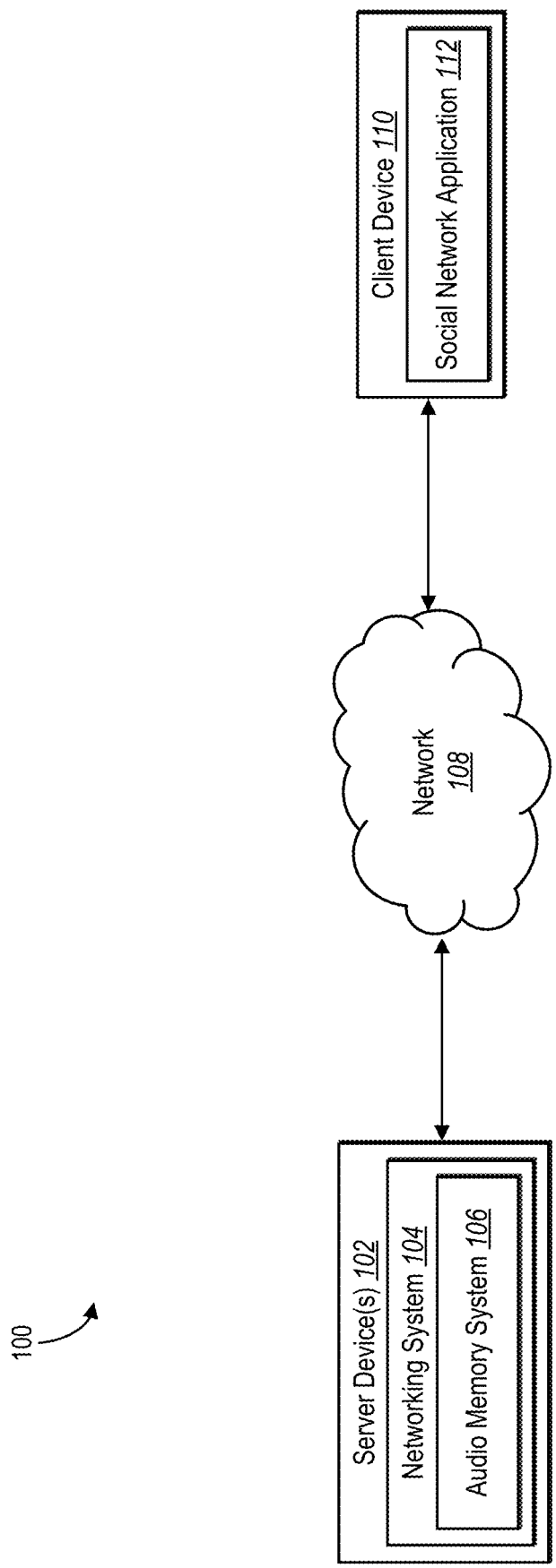
FIG. 1 illustrates an example environment in which an audio memory system can operate in accordance with one or more implementations.

Embodiments of the present disclosure provide benefits and/or solve one or more of the foregoing or other problems in the art with systems, non-transitory computer-readable media, and methods that generate audio memories tied to particular events within a networking system. For example, the audio memory system can generate audio memories from videos stored within a networking system and/or capture audio memories, via a client device, upon detecting a user interaction to capture an audio memory. Furthermore, the audio memory system can identify stored audio memories that match to an event corresponding to a user and provide, for display and playback within a client device of the user, the identified audio memories.

In some cases, the audio memory system generates audio memories from videos. For example, the audio memory system can identify videos from a video repository of a networking system to utilize for audio memories. In particular, the audio memory system can identify video that correspond to particular events related to a user of a networking user. In some embodiments, the audio memory system utilizes tags, speech recognition, machine learning models, and/or natural language processing to identify videos that correspond to particular events related to a user and/or persons related to the user. Then, the audio memory system can generate audio memories from the identified videos by scraping (or ripping) audio from the videos (or portions of the videos).

In one or more embodiments, the audio memory system detects a request to capture an audio memory from a client device. For example, the audio memory system can detect a request via a user interaction with a selectable element to capture an audio memory and/or a voice command to capture an audio memory. In response, the audio memory system can cause the client device to capture an audio recording of the environment through the client device. In some cases, the client device can capture spatial audio that captures audio and spatial information for the audio such that, during playback, the audio accurately recreates environmental positioning of audio sources.

Moreover, in one or more embodiments, the audio memory system accesses and provides audio memories to users based on events corresponding to the user. For instance, the audio memory system can identify event information corresponding to a user, such as, but not limited to a specific time corresponding to the user, a specific location corresponding to the user, and/or a user activity corresponding to the user or with other users. Subsequently, the audio memory system can match the event information to tags or metadata corresponding to saved audio memories to identify audio memories to surface to the user.

Indeed, the audio memory system can cause a client device to display the audio memories within a user account of a social networking application corresponding to the user. Upon detecting a user selection of an audio memory, the audio memory system can cause the client device to playback audio for the audio memory. In some cases, the audio memory system causes the client device to playback spatial audio that focuses on different audio sources in the audio recording based on a positioning of the client device (e.g., directional positioning of headphones of a user, directional positioning of augmented reality glasses of a user, directional positioning of a client device of a user).

As mentioned above, the audio memory system provides technical advantages and benefits over conventional systems. For example, unlike many conventional systems that are limited to surfacing visual content, the audio memory system can flexibly surface various combinations of visual and audio content to a user from past events. In addition to surfacing audio-based memories from a user's social networking account, the audio memory system also easily captures audio (e.g., audio or spatial audio) to generate an audio memory for an event through a client device upon receiving a user interaction to generate an audio memory.

Furthermore, in one or more embodiments, unlike conventional systems that utilize images and/or videos for event-based memories without emulating environmental presence, the audio memory system generates audio memories with spatial audio to capture an environmental presence of the audio sources recorded during the event. Indeed, the audio memory system can accurately generate an audio memory that recreates spatial placement of different audio sources (e.g., a stereo playing music, a first person speaking, a second person playing a guitar) within the same event by utilizing spatial audio that emphasizes the different audio sources based on a directional placement of a client device during playback.

Additional detail regarding the audio memory system will now be provided with reference to the figures. For example, FIG. 1 illustrates a schematic diagram of an exemplary system environment ("environment") 100 in which an audio memory system 106 can be implemented. As illustrated in FIG. 1, the environment 100 includes a server device(s) 102, a network 108, and a client device 110.

Although the environment 100 of FIG. 1 is depicted as having a particular number of components, the environment 100 can have any number of additional or alternative components (e.g., any number of server devices and/or client devices in communication with the audio memory system 106 either directly or via the network 108). Similarly, although FIG. 1 illustrates a particular arrangement of the server device(s) 102, the network 108, the client device 110, various additional arrangements are possible.

The server device(s) 102, the network 108, and the client device 110 may be communicatively coupled with each other either directly or indirectly (e.g., through the network 108 discussed in greater detail below in relation to FIGS. 12 and 13). Moreover, the server device(s) 102 and the client device 110 may include a variety of computing devices (including one or more computing devices as discussed in greater detail with relation to FIG. 11).

As mentioned above, the environment 100 includes the server device(s) 102. In one or more embodiments, the server device(s) 102 generates, stores, receives, and/or transmits digital data, including digital content, such as digital videos, digital audio, digital images, and/or social network posts. In some embodiments, the server device(s) 102 comprises a data server. In one or more embodiments, the server device(s) 102 comprises a communication server or a web-hosting server.

As shown in FIG. 1, the server device(s) 102 includes a networking system 104. In particular, the networking system 104 can provide a digital platform (e.g., a social network, instant messenger platform, extended-reality environment) that includes functionality through which users of the networking system 104 can connect to and/or interact with one another. For example, the networking system 104 can register a user (e.g., a user of the client device 110). The networking system 104 can further provide features through which the user can connect to and/or interact with co-users. For example, the networking system 104 can provide messaging features, chat features, and/or video call features through which a user can communicate with one or more co-users. The networking system 104 can also generate and provide groups and communities through which the user can associate with co-users. Additionally, the networking system 104 can store digital videos, digital audio, and/or digital images for one or more users.

In one or more embodiments, the networking system 104 comprises a social networking system, but in other embodiments the networking system 104 may comprise another type of system, including but not limited to an e-mail system, video calling system, search engine system, e-commerce system, banking system, metaverse system, or any number of other system types that use user accounts. In one or more embodiments where the networking system 104 comprises a social networking system, the networking system 104 may include a social graph system for representing and analyzing a plurality of users and concepts. A node storage of the social graph system can store node information comprising nodes for users, nodes for concepts, and nodes for items. An edge storage of the social graph system can store edge information comprising relationships between nodes and/or actions occurring within the social networking system. Further detail regarding social networking systems, social graphs, edges, and nodes is presented below with respect to FIGS. 12 and 13.

Furthermore, as shown in FIG. 1, the server device(s) 102 includes the audio memory system 106. In one or more embodiments, the audio memory system 106 generates audio memories tied to particular events within a networking system. Indeed, the audio memory system 106 can generate audio memories and can identify stored audio memories that match to an event corresponding to a user and provide, for display and playback within a client device of the user, the identified audio memories. Additionally, the audio memory system 106 is implemented as part of a social networking system that facilitates electronic communications such as instant messaging, video calling, and/or social network posts (e.g., as discussed in greater detail with relation to FIGS. 12 and 13).

Moreover, in one or more embodiments, the environment 100 includes the client device 110. For example, the client device 110 can include a computing device that is capable of interacting with the audio memory system 106 to generate and/or surface audio memories. Indeed, the client device 110 can capture audio and further generate audio memories (as described herein). In some implementations, the client device 110 includes at least one of a smartphone, a tablet, a desktop computer, a laptop computer, a head mounted display device (e.g., augmented reality glasses, virtual reality headset), or other electronic device (including one or more computing devices as discussed in greater detail with relation to FIG. 11). Although environment 100 includes a single client device, the environment 100 can include various numbers of client devices.

Figure 12:
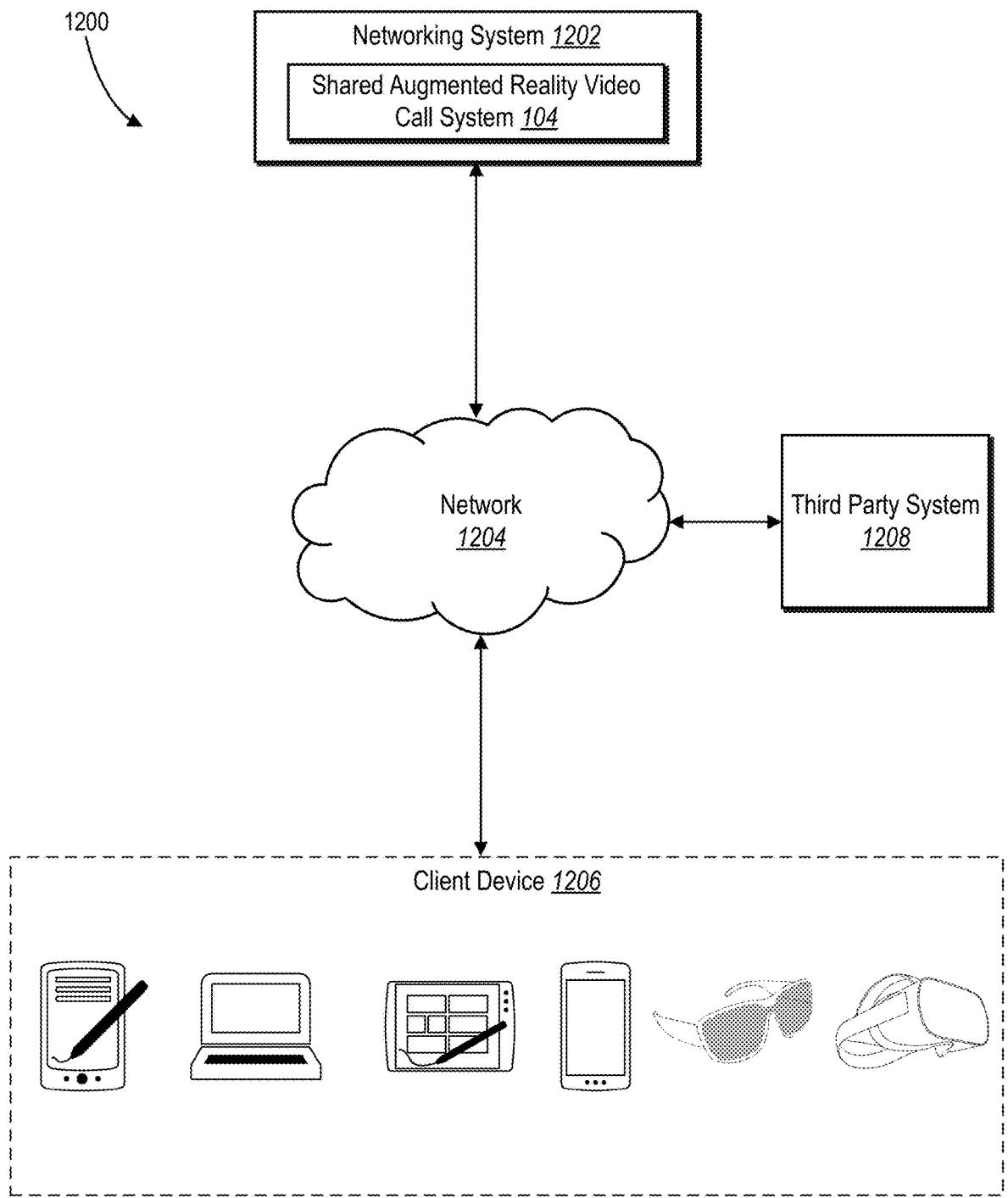
FIG. 12 illustrates an example environment of a networking system in accordance with one or more implementations.
Figure 13:
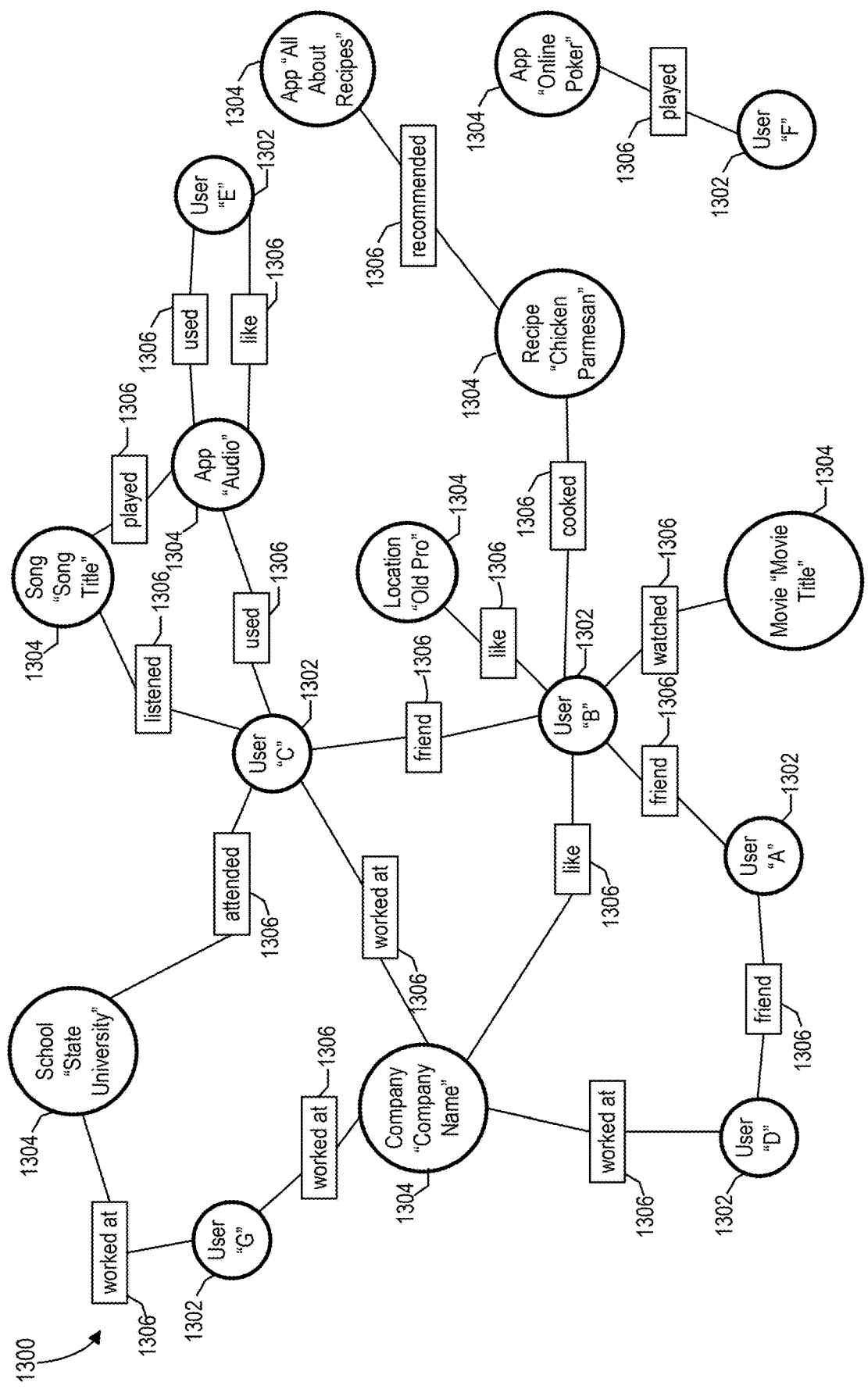
FIG. 13 illustrates an example social graph in accordance with one or more implementations.

Additionally, in some embodiments, each of the client device 110 is associated with one or more user accounts of a social network system (e.g., as described in relation to FIGS. 12 and 13). In one or more embodiments, the client device 110 includes one or more applications (e.g., the social network application 112) that are capable of interacting with the audio memory system 106, such as by capturing audio memories and/or playing back audio memories. In some instances, the social network application 112 can include software applications installed on the client device 110. In other cases, however, the social network application 112 includes a web browser or other application that accesses a software application hosted on the server device(s) 102.

Furthermore, the audio memory system 106 can be implemented in whole, or in part, by the individual elements of the environment 100. Indeed, although FIG. 1 illustrates the audio memory system 106 implemented with regard to the server device(s) 102, different components of the audio memory system 106 can be implemented by a variety of devices within the environment 100. For example, one or more (or all) components of the audio memory system 106 can be implemented by a different computing device (e.g., the client device 110) or a separate server from the server device(s) 102.

Figure 2:
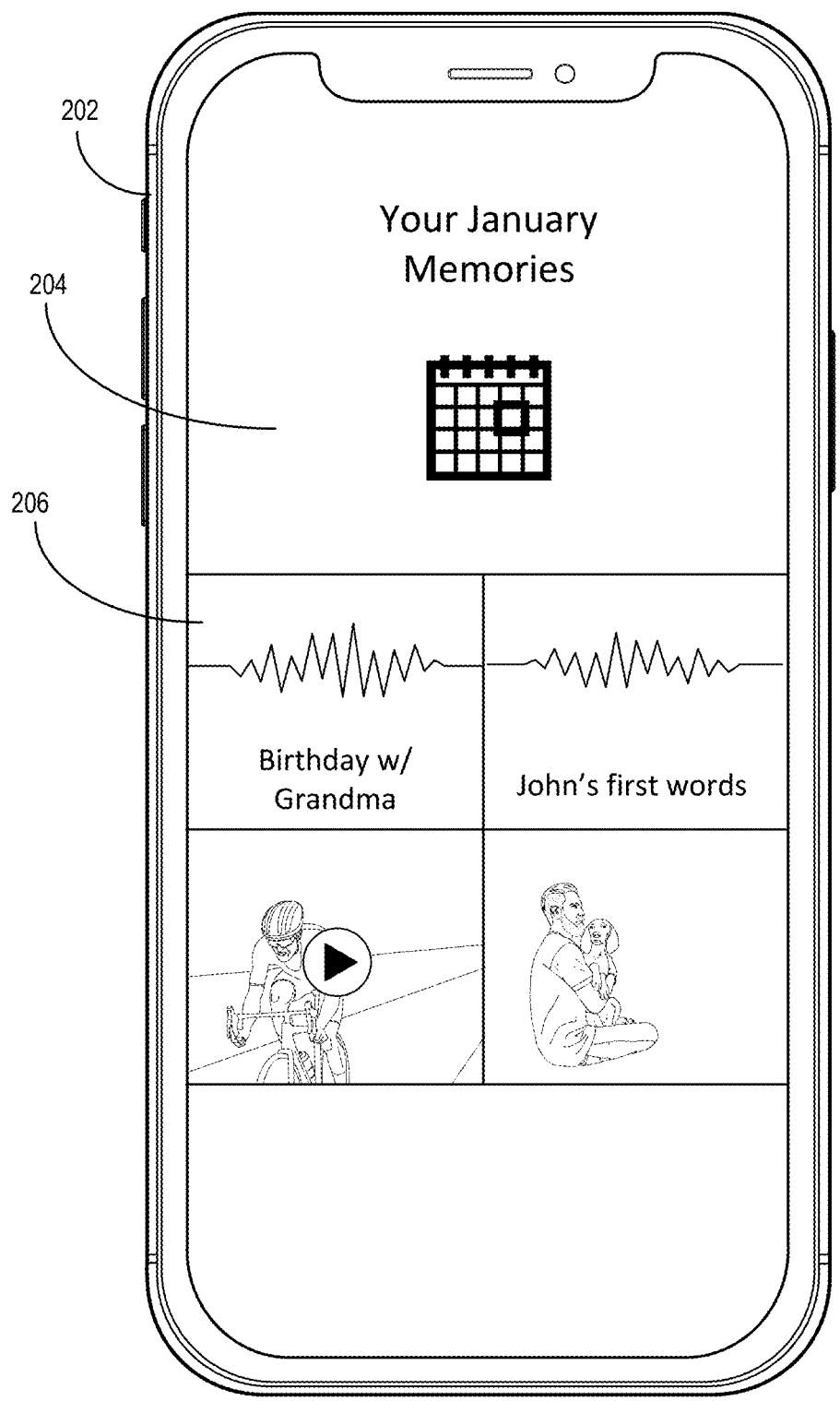
FIG. 2 illustrates an example of an audio memory system displaying an audio memory in accordance with one or more implementations.

As mentioned above, the audio memory system 106 can identify audio memories for a user and provide, for display, the audio memories on a client device corresponding to the user. For example, FIG. 2 illustrates the audio memory system 106 providing, for display, audio memories within a client device. As shown in FIG. 2, a client device 202 (within a graphical user interface of a social networking application) displays social content memories 204 for a particular event (e.g., the month of January). Indeed, as illustrated in FIG. 2, the client device 202 displays an audio memory 206 (e.g., an audio recording of a birthday that occurred in January). As further shown in FIG. 2, the client device 202 can also display other image and video-based memories corresponding to the event (e.g., January).

Figure 3:
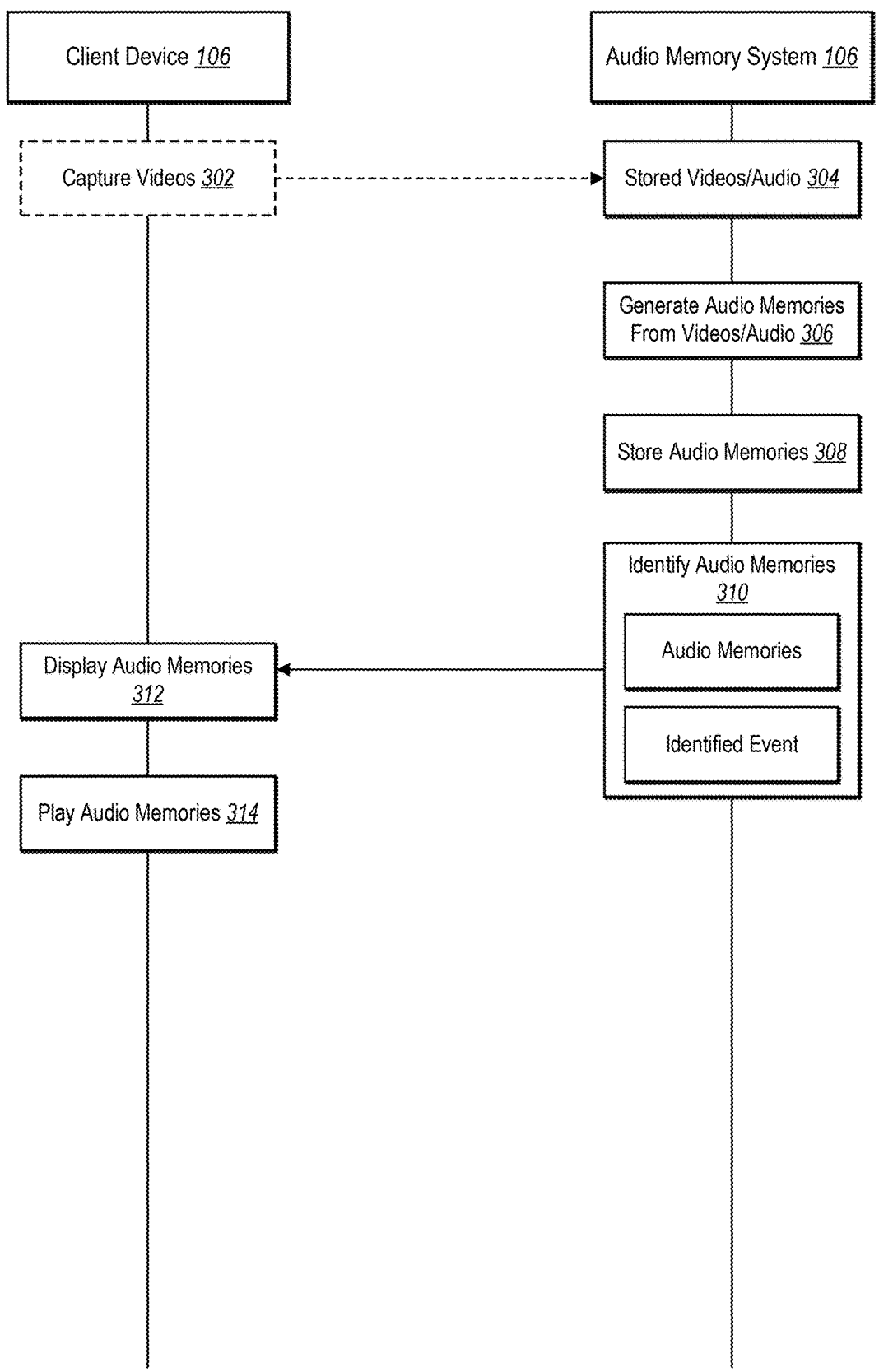
FIG. 3 illustrates a flow diagram of an audio memory system generating audio memories from videos in accordance with one or more implementations.

As further mentioned above, the audio memory system 106 can generate audio memories from videos. To illustrate, FIG. 3 illustrates a flow diagram of the audio memory system 106 generating audio memories from videos. For example, as shown in FIG. 3, the audio memory system 106 can identify videos corresponding to a user or an event for the user, generate audio memories from the videos, and also display audio memories on a client device.

As shown in act 302 of FIG. 3, a client device captures one or more videos. Indeed, one or more client devices can capture videos and upload videos to a networking system. Then, as shown in act 304 of FIG. 3, the audio memory system 106 stores videos uploaded from the client device. In some cases, as shown in the act 304 of FIG. 3, the audio memory system 106 can also receive audio from client devices and store the audio. Indeed, in one or more embodiments, the audio memory system 106 can store videos (and/or audio) and/or images of a user and/or various users as social network content within the networking system 104.

As further shown in act 306 of FIG. 3, the audio memory system 106 generates audio memories from the stored videos (and/or audio). For instance, the audio memory system 106 can search for videos corresponding to particular event relating to a user. Then, the audio memory system 106 can scrape the videos for audio content to generate audio memories. Indeed, the audio memory system 106 can search for videos and generate audio memories from the videos as described below (e.g., in relation to FIG. 4).

Additionally, as shown in act 308 of FIG. 3, the audio memory system 106 stores the audio memories upon generating the audio memories. In some cases, the audio memory system 106 stores the audio memories within the networking system 104. Moreover, as shown in act 310 of FIG. 3, upon identification of a particular event (e.g., an identified event), the audio memory system 106 identifies audio memories for a user based on matches between metadata and/or tags associated with the audio memories and the identified event (e.g., as described in FIG. 7).

Subsequently, as shown in act 312 of FIG. 3, the audio memory system 106 provides identified audio memories to the client device to display the audio memories. Moreover, as shown in act 314 of FIG. 3, the client device plays an audio memory (e.g., upon receiving a user selection of an audio memory from the displayed audio memories of the act 312). For instance, displaying and playing audio memories is described in greater detail below (e.g., in relation to FIGS. 8A and 8B).

Figure 4:
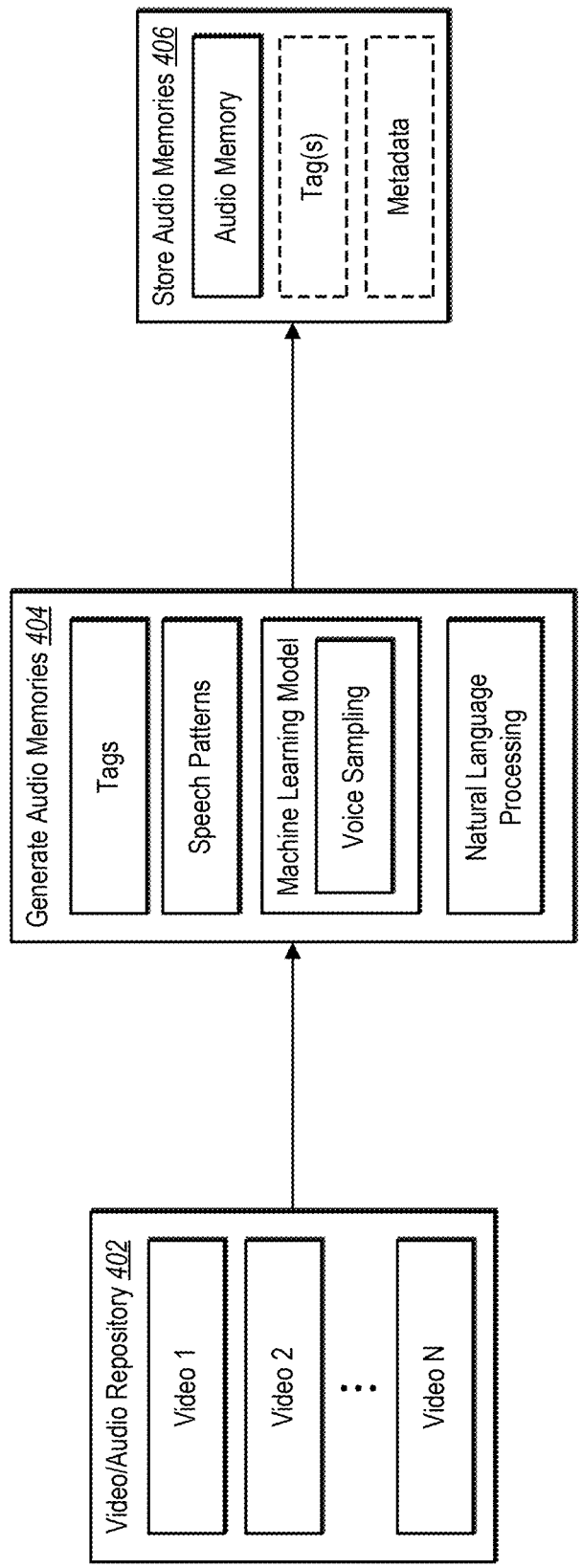
FIG. 4 illustrates an example of an audio memory system generating audio memories from videos in accordance with one or more implementations.

Furthermore, FIG. 4 illustrates the audio memory system 106 generating audio memories from videos (or audio file content). For example, as shown in FIG. 4, the audio memory system 106 accesses a video (and/or audio) repository 402 corresponding to the networking system 104. Indeed, the video repository can include videos uploaded by the user and/or videos corresponding to the user (e.g., videos in which the user is tagged, videos recognized to depict or portray the user). In some cases, the audio memory system 106 can also identify audio files within a repository (e.g., voicemails, voice messages, voice recordings).

Furthermore, as shown in act 404 of FIG. 4, the audio memory system 106 generates audio memories from the videos (and/or audios) in the video repository 402. As illustrated in FIG. 4, the audio memory system 106 can generate audio memories using tags. For example, the audio memory system 106 can identify tags that correspond to a particular user (e.g., a tag that indicates that the user is portrayed in the video, tags for persons associated with the user, tags for objects associated with the user, tags for locations associated with the user, tags for groups associated with the user. Then, the audio memory system 106 can select videos from the video repository 402 by matching the tags corresponding to the particular user to tags corresponding to the video. Subsequently, the audio memory system 106 generates audio memories from the selected videos based on tags.

In some cases, shown in FIG. 4, the audio memory system 106 can generate audio memories using speech patterns. For example, the audio memory system 106 can identify a speech pattern corresponding to a user and/or one or more users corresponding to the user (e.g., via the social graph as described below). Then, the audio memory system 106 can utilize the speech pattern to identify videos (and/or audio content) that include the same (or matching) speech patterns. Subsequently, the audio memory system 106 generates audio memories from the identified videos based on the speech patterns.

In some embodiments, as shown in FIG. 4, the audio memory system 106 generates audio memories using a machine learning model. For instance, the audio memory system 106 can utilize a machine learning model to identify one or more videos (or other audio content) that corresponds to a user. Indeed, the audio memory system 106 can utilize the machine learning model to predict that one or more videos include the user and/or are related to the user (e.g., a video depicting a person related to the user).

In some instances, the audio memory system 106 utilizes a machine learning model trained to detect a user (or persons related to the user) based on voice samplings. As an example, the audio memory system 106 can train a machine learning model by utilizing a training data set of videos of ground truth users and voice samples of the ground truth users. For instance, the audio memory system 106 can utilize the machine learning model with the training data set of videos to predict users corresponding to the videos. Then, the audio memory system 106 compares the predicted users to the ground truth users to generate a loss value. Indeed, the audio memory system 106 can learn parameters of the machine learning model utilizing the loss function. In one or more embodiments, the audio memory system 106 utilizes machine learning models, such as, but not limited to a convolutional neural network, a generative adversarial neural network, and/or a recurrent neural network.

In some cases, as shown in FIG. 4, the audio memory system 106 utilizes natural language processing to identify videos to generate audio memories. For instance, the audio memory system 106 can utilize natural language processing to generate a transcript for a video (and/or audio). Then, the audio memory system 106 can utilize the generated transcript to identify phrases and/or words associated with a user (e.g., a user's name, names of persons related to the user, phrases related to particular events, phrases corresponding to a user's interests). Then, the audio memory system 106 can generate audio memories from the videos that contain phrases and/or words associated with the user.

Additionally, upon identifying videos, the audio memory system 106 can generate an audio memory by selecting and extracting audio information from the video. For instance, the audio memory system 106 can utilize the entire audio information from a video as an audio memory. In one or more embodiments, the audio memory system 106 utilizes audio information from one or more portions of a video to generate an audio memory. As an example, the audio memory system 106 can identify specific portions that are associated to specific actions (e.g., singing, laughing, a user speaking, a person related to the user speaking) and generate one or more audio memories from the specific portions. Furthermore, in one or more embodiments, the audio memory system 106 generates an audio memory by creating an audio file from a video, such as, but not limited to an MP3 file, WAV files, and/or AIFF files.

For instance, in some cases, the audio memory system 106 identifies specific portions of a person related to the user speaking (or the user speaking) to generate an audio memory from the specific portion of the person. To illustrate, the audio memory system 106 can analyze a video(s) (and/or audio) from a video (and/or audio) repository to identify a person(s) in the video(s) connected to a particular user account in a social graph of the networking system. Then, the audio memory system 106 can extract audio of the person(s) from the video(s) (and/or audio) to generate an audio memory(s).

In particular, the audio memory system 106 can utilize tags, speech patterns, a machine learning model, and/or natural language processing (as described) to identify videos depicting (visually or via audio) a person connected to the user account (e.g., using social relationship data from a social graph as described herein) from the videos (and/or audio) in the video (and/or audio) repository. Then, the audio memory system 106 can extract audio recognized for the specific person (or persons) from the identified videos. Indeed, in one or more embodiments, the audio memory system 106 utilizes the extracted audio to generate an audio memory (of the specific person (or persons) for the user account. Although one or more embodiments describe identifying specific portions of videos and/or audio that depict persons to generate audio memories, the audio memory system 106 can identify events (e.g., birthday parties, weddings, speeches, laughter, singing) depicted (visually or via audio) within the videos and/or audio to extract audio corresponding to the identified specific portions as audio memories.

As an example, the audio memory system 106 can analyze a video stored in a video repository on the networking system 106 to recognize (or identify) a person related to the user of the user account (e.g., the user's father, the user's grandmother). Then, the audio memory system 106 can extract the audio corresponding to the recognized person from video to generate an audio memory. For instance, the audio memory system 106 can generate an audio memory of the person related to the user singing, talking, telling a joke, laughing in the video.

As further shown in FIG. 4, the audio memory system 106 stores audio memories in an act 406 upon generating the audio memories in the act 404. In addition to storing the audio memory, as shown in the act 406, the audio memory system 106 can also assign and store tags with an audio memory. For example, the audio memory system 106 can include one or more tags that indicate associations to a user and/or other persons represented by the audio memory, specific actions in the audio memory (e.g., singing, laughing), and/or specific events related to the audio memory (e.g., a birthday, an anniversary, a wedding).

Furthermore, as also shown in act 406 of FIG. 4, the audio memory system 106 can also assign and store metadata corresponding to an audio memory. For example, the audio memory system 106 can include metadata, such as, but not limited to, a time associated to the audio memory and/or a location associated to the audio memory (e.g., a geotag). In some cases, the audio memory system 106 can also include data for spatial audio with the stored audio memory.

Figure 5:
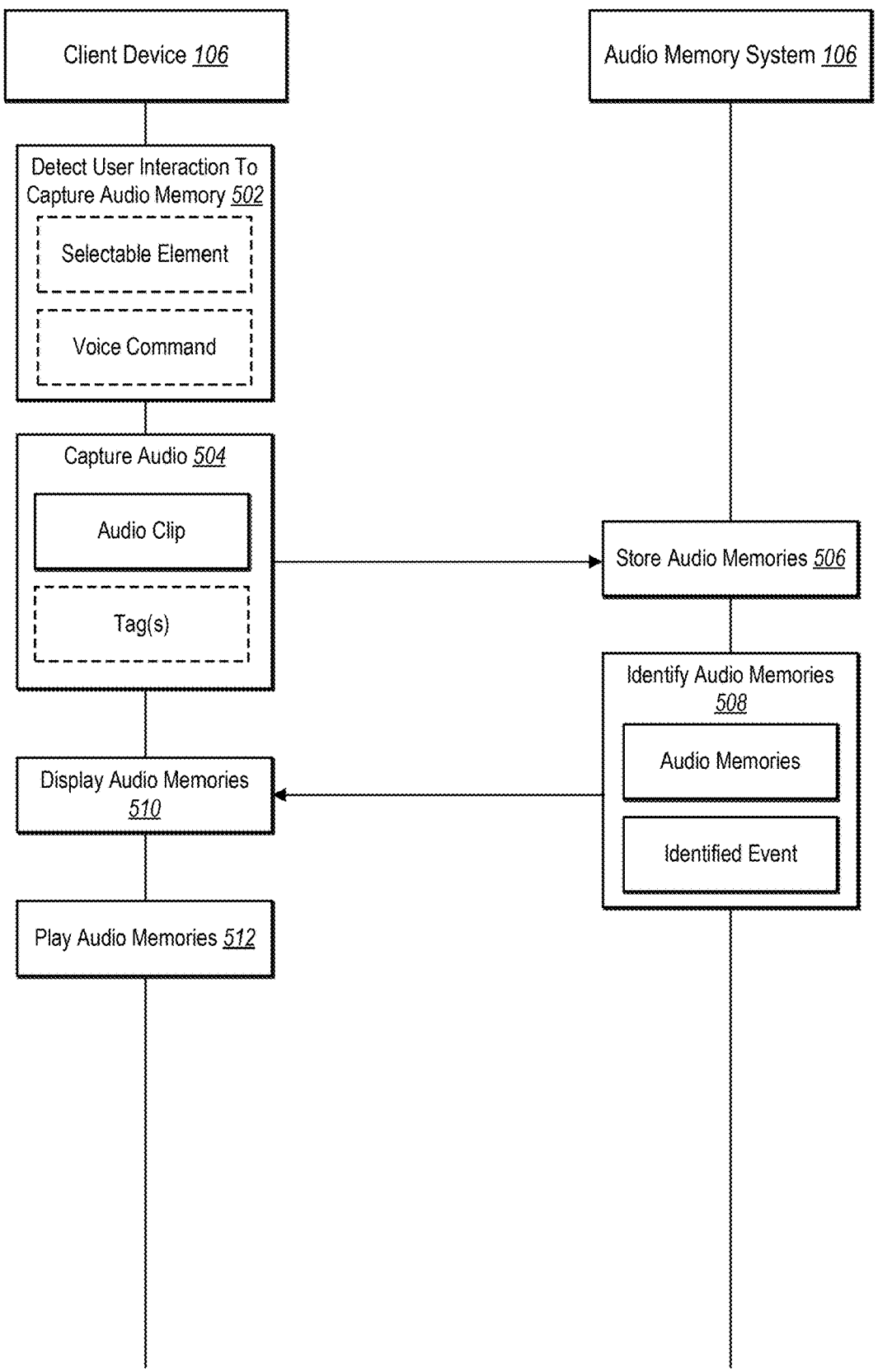
FIG. 5 illustrates a flow diagram of an audio memory system capturing audio memories in accordance with one or more implementations.

As mentioned above, the audio memory system 106 can generate audio memories from audio captured on a client device. To illustrate, FIG. 5 illustrates a flow diagram of the audio memory system 106 generating audio memories from audio captured on a client device. For instance, as shown in FIG. 5, the audio memory system 106 can identify detect a user interaction requesting to capture an audio memory on a client device and capture an audio memory on the client device. Subsequently, the audio memory system 106 can identify audio memories to display on the client device for particular events.

As shown in act 502 of FIG. 5, a client device detects a user interaction to capture an audio memory. As shown in FIG. 5, the client device can detect a user interaction requesting a capture of an audio memory via a user interaction with a selectable element within a graphical user interface of the client device. In one or more cases, the client device can detect a user interaction requesting a capture of an audio memory via a voice command received on the client device.

In response to detecting the user interaction to capture an audio memory, as shown in an act 504 of FIG. 5, the client device captures audio from an environment of the client device. For example, as shown in the act 504, the client device captures an audio clip for the audio memory. In some instances, the audio clip can include spatial audio. In addition, as shown in act 504 of FIG. 5, the client device can also receive or generate tags for the audio clip.

Additionally, as shown in act 506 of FIG. 5 and as described above, the audio memory system 106 stores the audio memories upon generating the audio memories. Moreover, as shown in the act 508 of FIG. 5, upon identification of a particular event (e.g., an identified event), the audio memory system 106 identifies audio memories for a user based on matches between metadata and/or tags associated with the audio memories and the identified event (e.g., as described in FIG. 7). Subsequently, as shown in act 510 of FIG. 5, the audio memory system 106 provides identified audio memories to the client device to display the audio memories. Furthermore, as illustrated in act 512 of FIG. 5, the client device plays an audio memory (e.g., upon receiving a user selection of an audio memory from the displayed audio memories of the act 510). For example, displaying and playing audio memories is described in greater detail below (e.g., in relation to FIGS. 8A and 8B).

Figure 6:
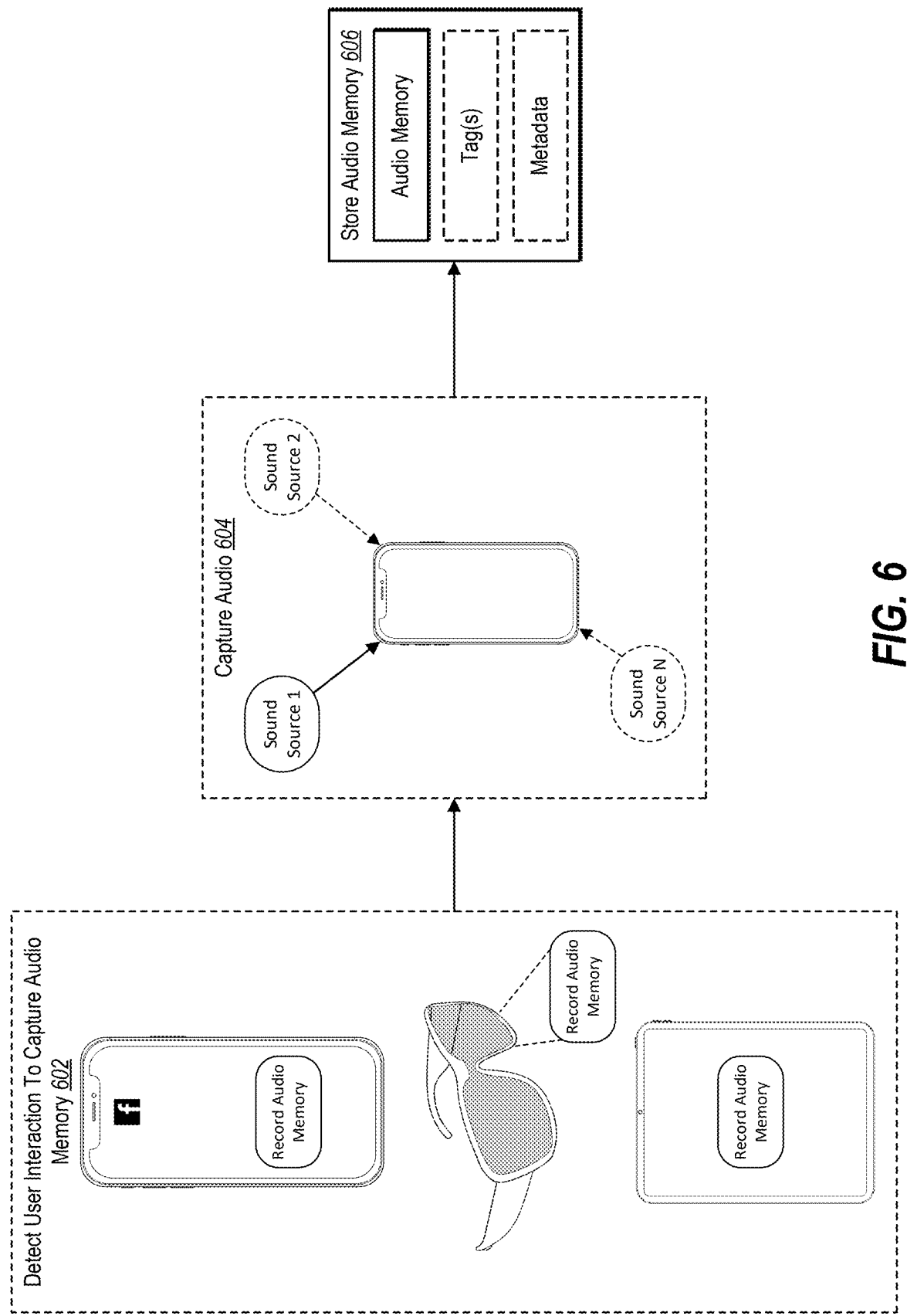
FIG. 6 illustrates an example of an audio memory system capturing audio memories in accordance with one or more implementations.

To illustrate, FIG. 6 provides an example of the audio memory system 106 capturing an audio memory on a client device. For example, FIG. 6 illustrates the audio memory system 106 receiving a user interaction requesting the capture of an audio memory. Furthermore, FIG. 6 also illustrates the audio memory system 106 capturing audio for the audio memory via the client device prior to storing the audio memory.

As shown in act 602 of FIG. 6, a client device detects a user interaction to capture an audio memory. As shown in the act 602 of FIG. 6, in some cases, a client device can provide, for display within a graphical user interface, a selectable element to request a capture of an audio memory. Upon receiving a user selection of the selectable element, the client device can initiate an audio capture for the audio memory.

As further shown in the act 602 of FIG. 6, a client device detects a voice command to capture an audio memory. To illustrate, in the act 602, a client device can receive a voice command requesting a capture of an audio memory and, in response, initiate an audio capture for the audio memory. As further shown in FIG. 6, various client devices can receive voice commands to capture an audio memory (e.g., a tablet device, AR glasses).

As further shown in act 604 of FIG. 6, the audio memory system 106, via a client device, captures audio for an audio memory. As illustrated in the act 604 of FIG. 6, the client device captures spatial audio that identifies various audio (or sound) sources in the environment of the client device to capture spatially aware audio. Indeed, as shown in the act 604, the client device can capture audio that identifies directional positions of sound sources and distances of sound sources from the client device. Although one or more embodiments illustrate a client device capturing and utilizing spatial audio, in some cases, the client device can also capture non-spatial audio from an environment.

In one or more embodiments, the audio memory system 106 can capture audio for an audio memory during a virtual reality (or extended reality) scene (e.g., a virtual reality event, a metaverse environment). For example, a client device, as an extended-reality device, can render a virtual reality environment in which one or more participant users communicate (e.g., via voice, avatars). The client device, upon receiving a request to capture an audio memory, can capture audio of the virtual reality environment and one or more users communicating within the virtual reality environment.

In some cases, the audio memory system 106 can capture audio for an audio memory during a video call, phone call, video conference, and/or phone conference. For example during a video call and/or phone call, the client device can receive a request to capture an audio memory. Upon receiving the request, the client device can capture an audio memory of the one or more users communicating within the video call and/or phone call.

As further shown in FIG. 6, the audio memory system 106 stores audio memories in an act 606 upon generating the audio memories in the act 604. As described above (e.g., in relation to FIG. 4), the audio memory system 106 can also assign and store tags with the audio memory. Furthermore, as described above (e.g., in relation to FIG. 4), the audio memory system 106 can also assign and store meta data with the audio memory.

Although one or more embodiments illustrate a smartphone capture audio for an audio memory, the audio memory system 106 can cause various client devices to capture audio memories. For example, the audio memory system 106 can utilize a client device, such as, but not limited to AR glasses, VR headsets, smart wearable devices (e.g., a smartwatch), and/or smart home devices.

Figure 7:
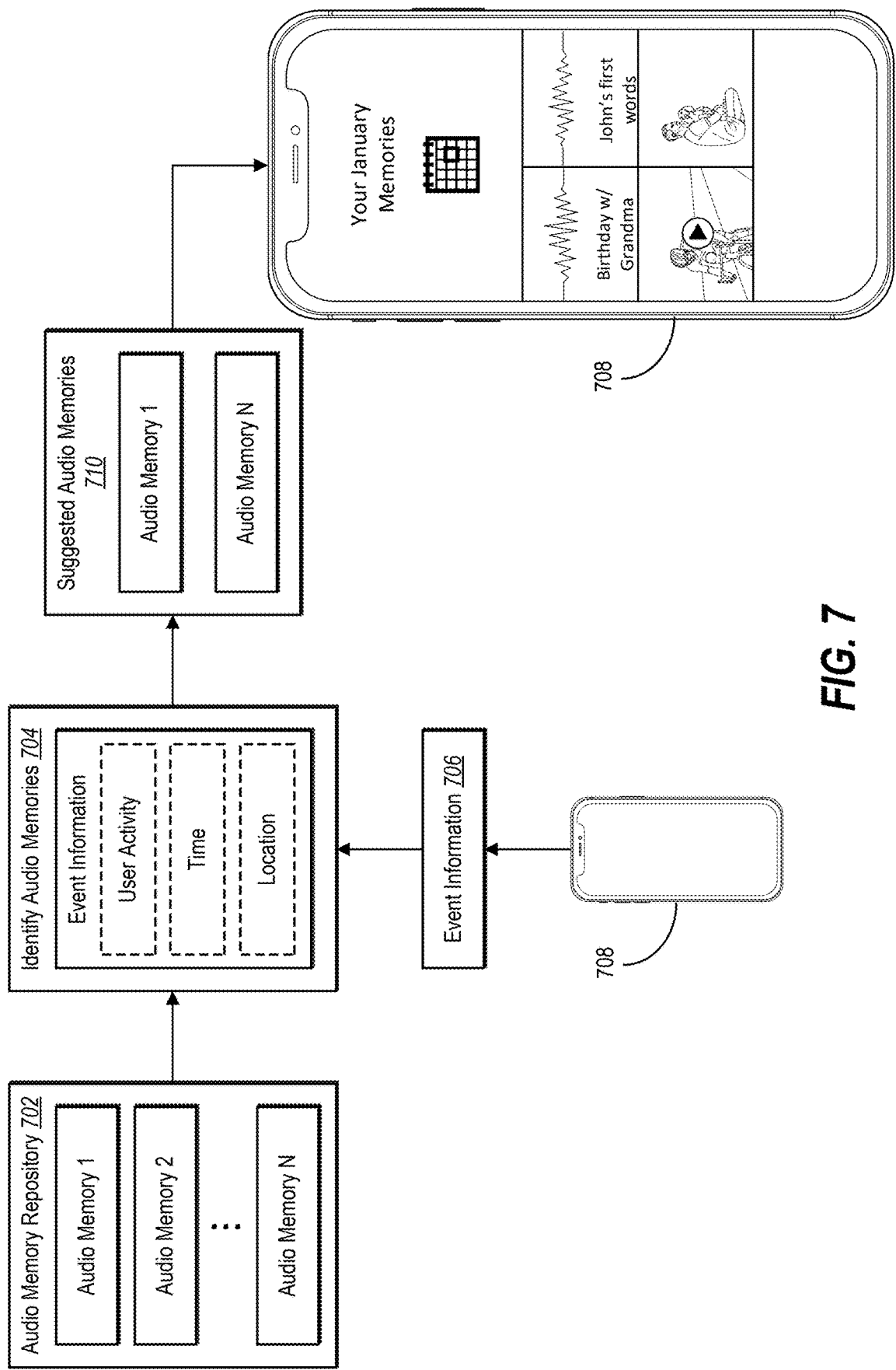
FIG. 7 illustrates an example of an audio memory system identifying audio memories for an event in accordance with one or more implementations.

As also mentioned above, the audio memory system 106 can identify stored audio memories that match to an event for a user and surface the identified audio memories within a client device of the user. For example, FIG. 7 illustrates the audio memory system 106 identifying and surfacing audio memories suggested for a user within a client device. Indeed, FIG. 7 illustrates the audio memory system 106 identifying audio memories for a specific event related to a user of a client device and, subsequently, displaying the identified audio memories within the client device.

As shown in FIG. 7, the audio memory system 106 accesses an audio memory repository 702 which includes one or more audio memories (e.g., audio memories captured or generated in accordance with one or more implementations herein). Moreover, as shown in an act 704 of FIG. 7, the audio memory system 106 utilizes event information 706 corresponding to a user of the client device 708 with event information associated with the audio memories (e.g., user activities, time, location) to determine suggested audio memories 710. Then, as shown in FIG. 7, the audio memory system 106 provides the suggested audio memories 710 for display within the client device 708.

In one or more embodiments, as shown in FIG. 7, the audio memory system 106 can utilize specific times to select audio memories. For instance, the audio memory system 106 can utilize event times, such as, but not limited to holiday dates, birth dates, relationship anniversaries, event anniversaries, funeral events, festival dates corresponding to a user to identify audio memories that match the particular event times. As an example, the audio memory system 106 can identify that it is a birthday of the user corresponding to a client device. Then, the audio memory system 106 can identify audio memories that are tagged specifically for the user's birthday and/or include a date corresponding to the user's birthday.

In some cases, as shown in FIG. 7, the audio memory system 106 can utilize location data to determine suggested audio memories. For example, the audio memory system 106 can determine a current location of a client device (e.g., via GPS, network data, or a user reported location). Then, the audio memory system 106 can utilize the current location to identify audio memories that include a geotag for the current location. Indeed, the audio memory system 106 can surface audio memories that occurred at the current location of the client device (e.g., in a previous time). For example, a location can include, but is not limited to, a previously visited tourist attraction, a previously visited restaurant, and/or a previously visited park.

Furthermore, as shown in FIG. 7, the audio memory system 106 can utilize user activity data to determine suggested audio memories. For example, the audio memory system 106 can identify user activities, such as, but not limited to, a user communicating with another user (e.g., via a messenger thread, video call), a user participating in a group video call or chat, and/or a user browsing another user's profile. In response, the audio memory system 106 can identify audio memories that are associated with the users involved with the user activity (e.g., the participating users). Indeed, the audio memory system 106 can identify audio memories that include voices of the users participating in the messenger thread, video call, and/or group video call. In addition, the audio memory system 106 can also identify audio memories that include voices of the other user from a browsed user profile.

In one or more embodiments, the audio memory system 106 can also utilize social relationship data from a network graph for audio memories. For example, the audio memory system 106 can utilize social relationship data to identify one or more persons (or users) related to a user. Subsequently, the audio memory system 106 can identify audio memories that correspond to the identified persons (or users). Indeed, the audio memory system 106 can identify audio memories that include voices of friends, family, or other social relationship with a user.

In some embodiments, the audio memory system 106 can provide, for display, a graphical user interface to browse one or more audio memories associated with a user. For example, the audio memory system 106 can provide, for display, a library (or collection) of audio memories that are selectable within a user profile (on a client device). In some cases, the audio memory system 106 can categorize the library (or collection) of audio memories based on one or more tags and/or identified events (as described above).

In one or more embodiments, the audio memory system 106 can provide a generated collection of audio memories for display within a graphical user interface of a client device. In particular, the audio memory system 106 can identify multiple audio memories corresponding to a particular event and combine the audio memories. Then, the audio memory system 106 can provided the combined audio memory to a client device (for display and playback as described herein).

Figure 8A:
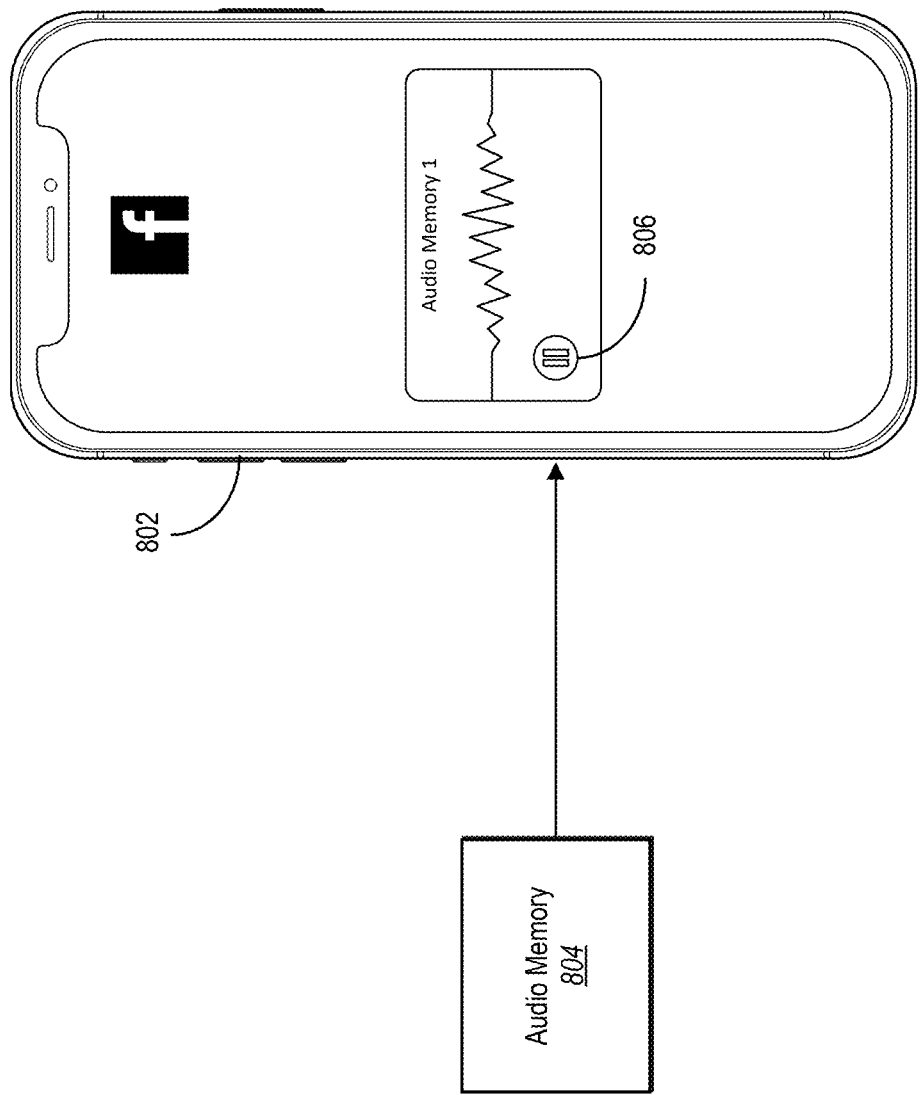
FIGS. 8A and 8B illustrate examples of an audio memory system playing back audio memories in accordance with one or more implementations.
Figure 8B:
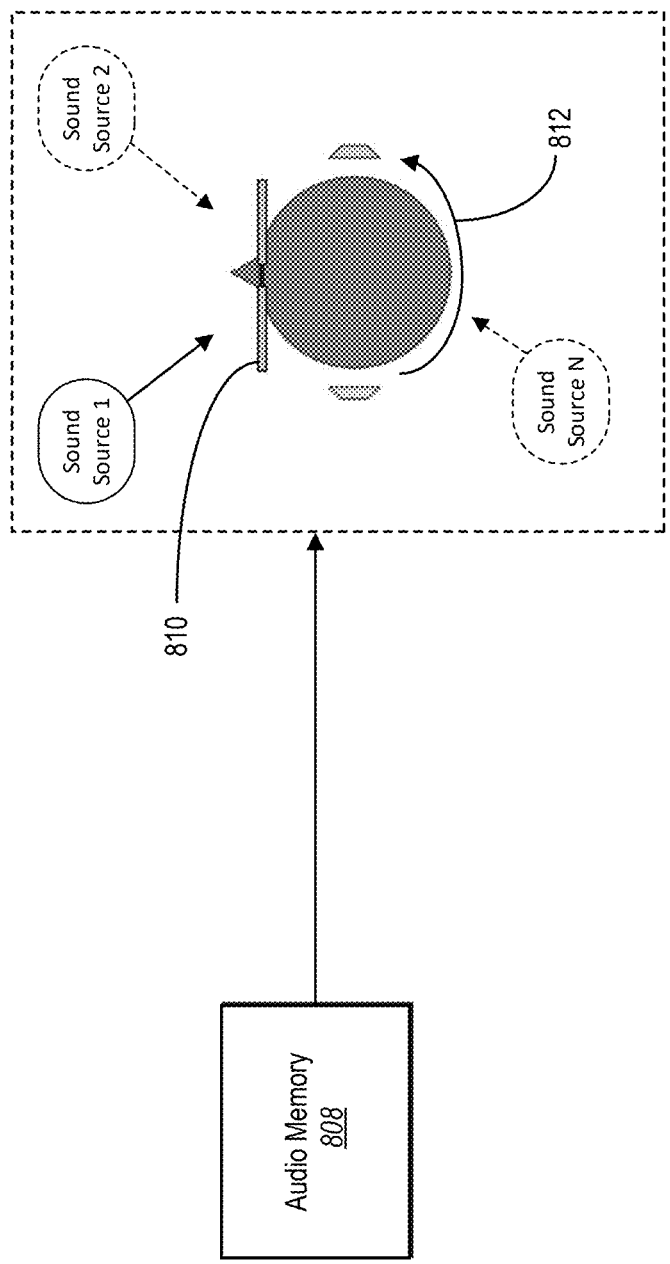

As mentioned above, the audio memory system 106 can cause a client device to playback an audio memory (e.g., upon receiving a user selection of an audio memory). For example, as shown in FIGS. 8A and 8B, the audio memory system 106 can playback an audio memory via a client device. Indeed, as shown in FIG. 8A, the audio memory system 106 can cause a client device 802 to receive an audio memory 804. Then, as shown in FIG. 8A, the audio memory system 106 can cause the client device 802 to play the audio memory via a playback option 806.

Furthermore, as shown in FIG. 8B, the audio memory system 106 can enable a client device to play an audio memory utilizing spatial audio. For example, as shown in FIG. 8B, the audio memory system 106 provides an audio memory 808 to a client device 810 (e.g., augmented reality glasses). Moreover, as shown in FIG. 8B, the client device 810 can play spatial audio for the audio memory 808 such that sound is perceived to be created from multiple sound sources. As shown in FIG. 8B, upon the client device 810 emphasizes different sound sources based on a movement 812. Indeed, the audio memory system 106 causes the client device 810 to play (or change dynamics) of the audio from the audio memory based on a direction of the client device 810 (e.g., via the movement 812). Indeed, the audio memory system 106 causes a client device to generate spatial audio to emulate audio from a real-world environment (e.g., background noises, directional noises, different person noises, room acoustics).

As an example of the audio memory system 106 generating an audio memory, a client device can, while conducting a video call, receive a user interaction to capture an audio memory. During the capture of the audio memory, the client device can capture voices of the participant users on the video call, background noise in a room (e.g., room acoustics, such as a television, kitchen noises, children playing). Subsequently, at a later time, the audio memory system 106 can provide the captured audio memory for playback to emulate the sounds of the environment and room captured during the video call.

As another example, the audio memory system 106 can within a social network application provide a notification indicating that a captured audio memory (e.g., a singular audio memory or a combined audio memory) is available for a user. The audio memory system 106 can, upon receiving a user interaction requesting to listen to the audio memory, the audio memory system 106 within the social network application can playback the audio memory.

As another example, the audio memory system 106 can receive a user interaction to capture an audio memory at a music concert (via a client device). The audio memory system 106 can cause the client device to capture audio of the concert from the perspective of the user (e.g., the user holding the mobile device, wearing the AR glasses) that is a spatially accurate first-person audio view of the music concert.

Figure 9:
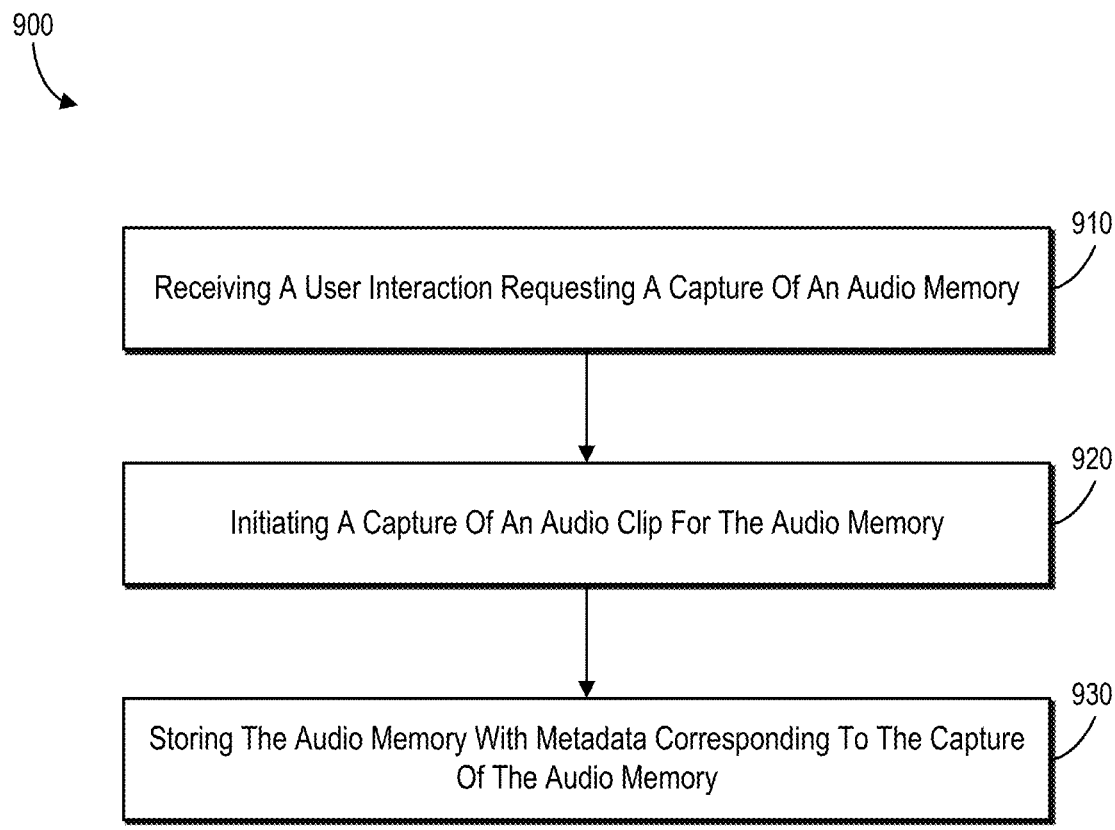
FIGS. 9 and 10 illustrates a flowchart of a series of acts for generating audio memories in accordance with one or more implementations.
Figure 10:
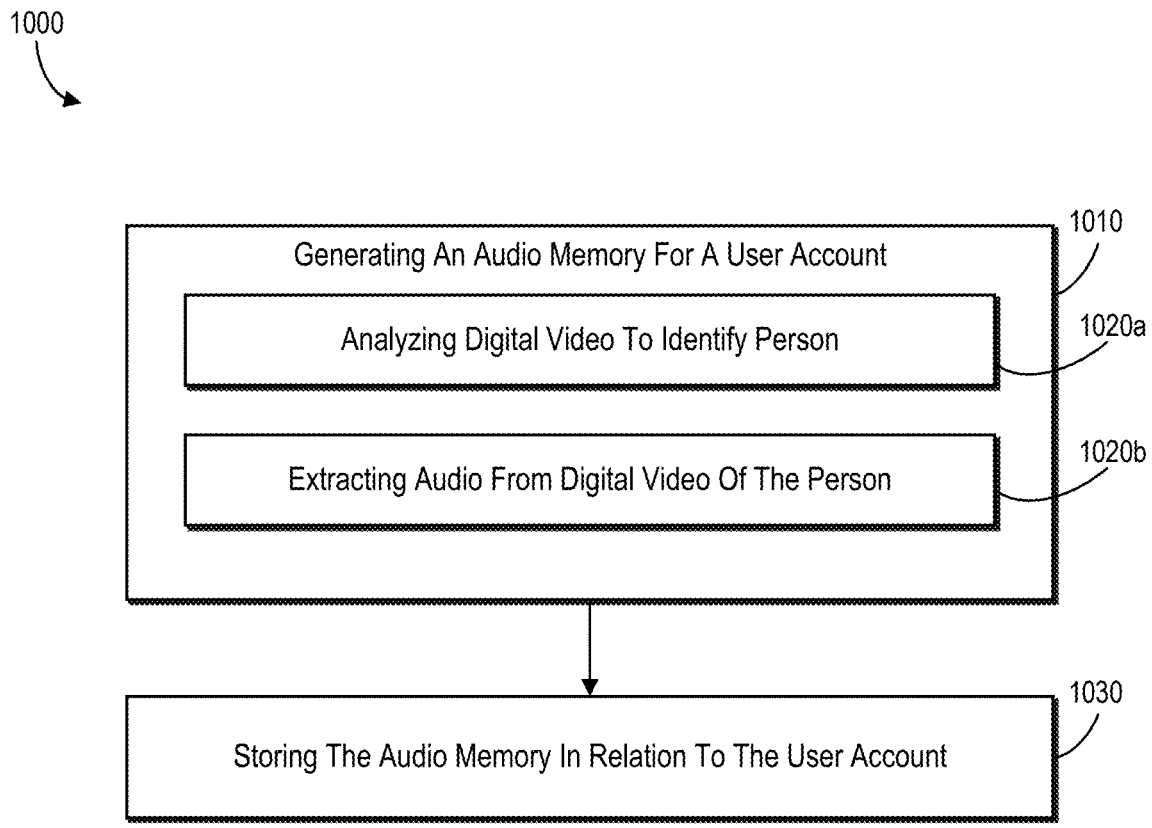

FIGS. 1-8, the corresponding text and the examples provide a number of different methods, systems, devices, and non-transitory computer-readable media of the audio memory system 106. In addition to the foregoing, one or more embodiments can also be described in terms of flowcharts comprising acts for accomplishing particular results, as shown in FIGS. 9 and 10. FIGS. 9 and 10 may be performed with more or fewer acts. Furthermore, the acts shown in FIGS. 9 and 10 may be performed in different orders. Additionally, the acts described in FIGS. 9 and 10 may be repeated or performed in parallel with one another or in parallel with different instances of the same or similar acts.

For example, FIG. 9 illustrates a flowchart of a series of acts 900 for generating audio memories in accordance with one or more implementations. While FIG. 9 illustrates acts according to one or more embodiments, alternative embodiments may omit, add to, reorder, and/or modify any of the acts shown in FIG. 9. In some implementations, the acts of FIG. 9 are performed as part of a method. Alternatively, a non-transitory computer-readable medium can store instructions thereon that, when executed by at least one processor, cause a computing device to perform the acts of FIG. 9. In some embodiments, a system performs the acts of FIG. 9. For example, in one or more embodiments, a system includes at least one processor. The system can further include a non-transitory computer-readable medium comprising instructions that, when executed by the at least one processor, cause the system to perform the acts of FIG. 9.

As shown in FIG. 9, the series of acts 900 include an act 910 of receiving a user interaction requesting a capture of an audio memory. Furthermore, the series of acts 900 includes an act 920 of initiating a capture of an audio clip for the audio memory. Moreover, the series of acts 900 includes an act 930 of storing the audio memory with metadata corresponding to the capture of the audio memory.

Furthermore, FIG. 10 illustrates a flowchart of a series of acts 1000 for generating audio memories in accordance with one or more implementations. While FIG. 10 illustrates acts according to one or more embodiments, alternative embodiments may omit, add to, reorder, and/or modify any of the acts shown in FIG. 10. In some implementations, the acts of FIG. 10 are performed as part of a method. Alternatively, a non-transitory computer-readable medium can store instructions thereon that, when executed by at least one processor, cause a computing device to perform the acts of FIG. 10. In some embodiments, a system performs the acts of FIG. 10. For example, in one or more embodiments, a system includes at least one processor. The system can further include a non-transitory computer-readable medium comprising instructions that, when executed by the at least one processor, cause the system to perform the acts of FIG. 10.

As shown in FIG. 10, the series of acts 1000 include an act 1010 of generating an audio memory for a user account (which can include an act 1020a of analyzing a digital video to identify a person and an act 1020b of extracting audio from the digital video of the person) and an act 1030 of storing the audio memory in relation to the user account.

In particular, the act 1010, the act 1020a, and the act 1020b can include generating an audio memory for a user account of a networking system by analyzing a digital video to identify a person in the digital video connected to the user account in a social graph of the networking system and extracting audio of the person from the digital video, and the act 1030 can include storing the audio memory within the networking system in relation to the user account.

For instance, the series of acts 1000 can include receiving the digital video from a live video capture from a client device of corresponding to user account and generating the audio memory based on detecting a user interaction on the client device to request a capture the audio memory. For example, the user interaction can include a user selection of graphical element to request the audio memory or a voice command input to request the audio memory. Furthermore, the client device can include a smartphone, a head-mounted display, a smart wearable device, or a smart home device.

Additionally, the series of acts 1000 can include identifying the digital video from digital videos stored in the networking system for the user account. Furthermore, the series of acts 1000 can include utilizing machine learning to detect persons within digital videos based on voice samples to identify the person in the digital video. Moreover, the series of acts 1000 can include identifying the person in the digital video is connected to the user account utilizing social relationship data from the social graph of the networking system between the user account and the identified person.

Moreover, the series of acts 1000 can include analyzing the digital video and the audio from the digital video to determine metadata. For example, the metadata can include a geolocation, time data, event information, natural language processing transcripts, or user provided tags for the digital video. Furthermore, the series of acts 1000 can include storing the audio memory with the metadata within the networking system.

In addition, the series of acts 1000 can include identifying one or more suggested audio memories from audio memories stored on the networking system that comprise metadata corresponding to a particular event of the user account and displaying, within a client device of the user account, the one or more suggested audio memories for the particular event with selectable options to playback the suggested audio memories. Additionally, the series of acts 1000 can include enabling a client device of the user account to playback the audio memory utilizing spatial audio by causing the client device to adjust dynamics of audio from the audio memory based on movement of the client device.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 11:
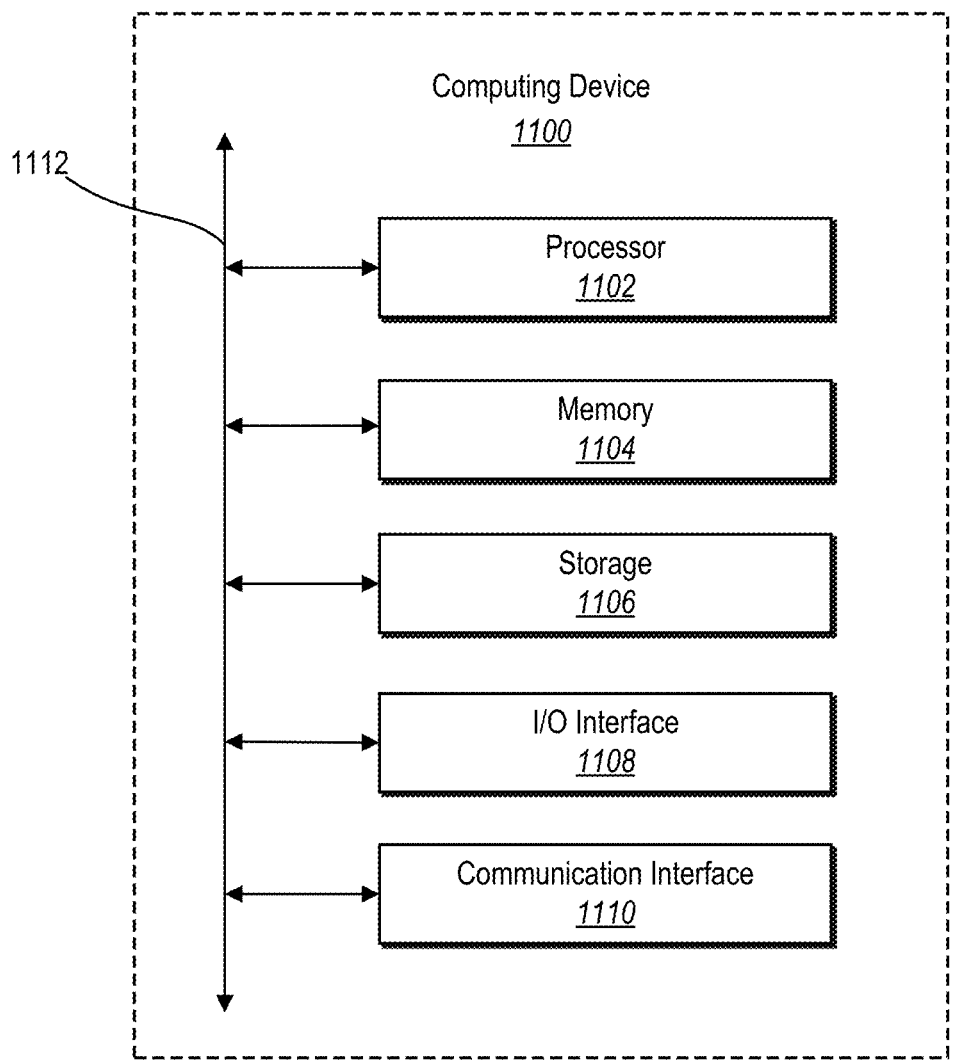
FIG. 11 illustrates a block diagram of an example computing device in accordance with one or more implementations.

FIG. 11 illustrates a block diagram of an example computing device 1100 that may be configured to perform one or more of the processes described above. One will appreciate that one or more computing devices, such as the computing device 1100 may represent the computing devices described above (e.g., server device(s) 102 and/or a client device 110). In one or more embodiments, the computing device 1100 may be a mobile device (e.g., a mobile telephone, a smartphone, a PDA, a tablet, a laptop, a camera, a tracker, a watch, a wearable device, a head mounted display, etc.). In some embodiments, the computing device 1100 may be a non-mobile device (e.g., a desktop computer or another type of client device). Further, the computing device 1100 may be a server device that includes cloud-based processing and storage capabilities.

As shown in FIG. 11, the computing device 1100 can include one or more processor(s) 1102, memory 1104, a storage device 1106, input/output interfaces 1108 (or "I/O interfaces 1108"), and a communication interface 1110, which may be communicatively coupled by way of a communication infrastructure (e.g., bus 1112). While the computing device 1100 is shown in FIG. 11, the components illustrated in FIG. 11 are not intended to be limiting. Additional or alternative components may be used in other embodiments. Furthermore, in certain embodiments, the computing device 1100 includes fewer components than those shown in FIG. 11. Components of the computing device 1100 shown in FIG. 11 will now be described in additional detail.

In particular embodiments, the processor(s) 1102 includes hardware for executing instructions, such as those making up a computer program. As an example, and not by way of limitation, to execute instructions, the processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, the storage device 1106 can include a non-transitory storage medium described above. The storage device 1106 may include a hard disk drive (HDD), flash memory, a Universal Serial Bus (USB) drive or a combination these or other storage devices.

As shown, the computing device 1100 includes one or more I/O interfaces 1108, which are provided to allow a user to provide input to (such as user strokes), receive output from, and otherwise transfer data to and from the computing device 1100. These I/O interfaces 1108 may include a mouse, keypad or a keyboard, a touch screen, camera, optical scanner, network interface, modem, other known I/O devices or a combination of such I/O interfaces 1108. The touch screen may be activated with a stylus or a finger.

The I/O interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1108 are configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 provides one or more interfaces for communication (such as, for example, packet-based communication) between the computing device and one or more other computing devices or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can include hardware, software, or both that connects components of computing device 1100 to each other. As an example, the bus 1112 may include one or more types of buses.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

As mentioned above, the communications system can be included in a social networking system. A social networking system may enable its users (such as persons or organizations) to interact with the system and with each other. The social networking system may, with input from a user, create and store in the social networking system a user profile associated with the user. As described above, the user profile may include demographic information, communication channel information, and information on personal interests of the user.

In more detail, user profile information may include, for example, biographic information, demographic information, behavioral information, the social information, or other types of descriptive information, such as work experience, educational history, hobbies or preferences, interests, affinities, or location. Interest information may include interests related to one or more categories, which may be general or specific. As an example, if a user "likes" an article about a brand of shoes, the category may be the brand.

The social networking system may also, with input from a user, create and store a record of relationships of the user with other users of the social networking system, as well as provide services (e.g., wall posts, photo-sharing, online calendars and event organization, messaging, games, or advertisements) to facilitate social interaction between or among users. Also, the social networking system may allow users to post photographs and other multimedia content items to a user's profile page (typically known as "wall posts" or "timeline posts") or in a photo album, both of which may be accessible to other users of the social networking system depending on the user's configured privacy settings. Herein, the term "friend" may refer to any other user of the social networking system with which a user has formed a connection, association, or relationship via the social networking system.

FIG. 12 illustrates an example network environment 1200 of a social networking system. Network environment 1200 includes a client device 1206, a networking system 1202 (e.g., a social networking system and/or an electronic messaging system), and a third-party system 1208 connected to each other by a network 1204. Although FIG. 12 illustrates a particular arrangement of client device 1206, networking system 1202, third-party system 1208, and network 1204, this disclosure contemplates any suitable arrangement of client device 1206, networking system 1202, third-party system 1208, and network 1204. As an example and not by way of limitation, two or more of client device 1206, networking system 1202, and third-party system 1208 may be connected to each other directly, bypassing network 1204. As another example, two or more of client device 1206, networking system 1202, and third-party system 1208 may be physically or logically co-located with each other in whole or in part. Moreover, although FIG. 12 illustrates a particular number of client devices 1206, networking systems 1202, third-party systems 1208, and networks 1204, this disclosure contemplates any suitable number of client devices 1206, networking systems 1202, third-party systems 1208, and networks 1204. As an example and not by way of limitation, network environment 1200 may include multiple client device 1206, networking systems 1202, third-party systems 1208, and networks 1204.

This disclosure contemplates any suitable network 1204. As an example and not by way of limitation, one or more portions of network 1204 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1204 may include one or more networks 1204.

Links may connect client device 1206, networking system 1202, and third-party system 1208 to communication network 1204 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1200. One or more first links may differ in one or more respects from one or more second links.

In particular embodiments, client device 1206 may be an electronic device including hardware, software, or embedded logic components or a combination of two or more such components and capable of carrying out the appropriate functionalities implemented or supported by client device 1206. As an example and not by way of limitation, a client device 1206 may include a computer system such as an augmented reality display device, a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client devices 1206. A client device 1206 may enable a network user at client device 1206 to access network 1204. A client device 1206 may enable its user to communicate with other users at other client devices 1206.

In particular embodiments, client device 1206 may include a web browser, and may have one or more add-ons, plug-ins, or other extensions. A user at client device 1206 may enter a Uniform Resource Locator (URL) or other address directing the web browser to a particular server (such as server, or a server associated with a third-party system 1208), and the web browser may generate a Hyper Text Transfer Protocol (HTTP) request and communicate the HTTP request to server. The server may accept the HTTP request and communicate to client device 1206 one or more Hyper Text Markup Language (HTML) files responsive to the HTTP request. Client device 1206 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, networking system 1202 may be a network-addressable computing system that can host an online social network. Networking system 1202 may generate, store, receive, and send social-networking data, such as, for example, user-profile data, concept-profile data, social-graph information, or other suitable data related to the online social network. Networking system 1202 may be accessed by the other components of network environment 1200 either directly or via network 1204. In particular embodiments, networking system 1202 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, networking system 1202 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 1206, a networking system 1202, or a third-party system 1208 to manage, retrieve, modify, add, or delete, the information stored in data store.

In particular embodiments, networking system 1202 may store one or more social graphs in one or more data stores. In particular embodiments, a social graph may include multiple nodes—which may include multiple user nodes (each corresponding to a particular user) or multiple concept nodes (each corresponding to a particular concept)—and multiple edges connecting the nodes. Networking system 1202 may provide users of the online social network the ability to communicate and interact with other users. In particular embodiments, users may join the online social network via networking system 1202 and then add connections (e.g., relationships) to a number of other users of networking system 1202 that they want to be connected to. Herein, the term "friend" may refer to any other user of networking system 1202 with whom a user has formed a connection, association, or relationship via networking system 1202.

In particular embodiments, networking system 1202 may provide users with the ability to take actions on various types of items or objects, supported by networking system 1202. As an example and not by way of limitation, the items and objects may include groups or social networks to which users of networking system 1202 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in networking system 1202 or by an external system of third-party system 1208, which is separate from networking system 1202 and coupled to networking system 1202 via a network 1204.

In particular embodiments, networking system 1202 may be capable of linking a variety of entities. As an example and not by way of limitation, networking system 1202 may enable users to interact with each other as well as receive content from third-party systems 1208 or other entities, or to allow users to interact with these entities through an application programming interfaces (API) or other communication channels.

In particular embodiments, a third-party system 1208 may include one or more types of servers, one or more data stores, one or more interfaces, including but not limited to APIs, one or more web services, one or more content sources, one or more networks, or any other suitable components, e.g., that servers may communicate with. A third-party system 1208 may be operated by a different entity from an entity operating networking system 1202. In particular embodiments, however, networking system 1202 and third-party systems 1208 may operate in conjunction with each other to provide social-networking services to users of networking system 1202 or third-party systems 1208. In this sense, networking system 1202 may provide a platform, or backbone, which other systems, such as third-party systems 1208, may use to provide social-networking services and functionality to users across the Internet.

In particular embodiments, a third-party system 1208 may include a third-party content object provider. A third-party content object provider may include one or more sources of content objects, which may be communicated to a client device 1206. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, networking system 1202 also includes user-generated content objects, which may enhance a user's interactions with networking system 1202. User-generated content may include anything a user can add, upload, send, or "post" to networking system 1202. As an example and not by way of limitation, a user communicates posts to networking system 1202 from a client device 1206. Posts may include data such as status updates or other textual data, location information, photos, videos, links, music or other similar data or media. Content may also be added to networking system 1202 by a third-party through a "communication channel," such as a newsfeed or stream.

In particular embodiments, networking system 1202 may include a variety of servers, sub-systems, programs, modules, logs, and data stores. In particular embodiments, networking system 1202 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Networking system 1202 may also include suitable components such as network interfaces, security mechanisms, load balancers, failover servers, management-and-network-operations consoles, other suitable components, or any suitable combination thereof. In particular embodiments, networking system 1202 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking networking system 1202 to one or more client devices 1206 or one or more third-party system 1208 via network 1204. The web server may include a mail server or other messaging functionality for receiving and routing messages between networking system 1202 and one or more client devices 1206. An API-request server may allow a third-party system 1208 to access information from networking system 1202 by calling one or more APIs. An action logger may be used to receive communications from a web server about a user's actions on or off networking system 1202. In conjunction with the action log, a third-party-content-object log may be maintained of user exposures to third-party-content objects. A notification controller may provide information regarding content objects to a client device 1206. Information may be pushed to a client device 1206 as notifications, or information may be pulled from client device 1206 responsive to a request received from client device 1206. Authorization servers may be used to enforce one or more privacy settings of the users of networking system 1202. A privacy setting of a user determines how particular information associated with a user can be shared. The authorization server may allow users to opt in to or opt out of having their actions logged by networking system 1202 or shared with other systems (e.g., third-party system 1208), such as, for example, by setting appropriate privacy settings. Third-party-content-object stores may be used to store content objects received from third parties, such as a third-party system 1208. Location stores may be used for storing location information received from client devices 1206 associated with users. Advertisement-pricing modules may combine social information, the current time, location information, or other suitable information to provide relevant advertisements, in the form of notifications, to a user.

FIG. 13 illustrates example social graph 1300. In particular embodiments, networking system 1202 may store one or more social graphs 1300 in one or more data stores. In particular embodiments, social graph 1300 may include multiple nodes—which may include multiple user nodes 1302 or multiple concept nodes 1304—and multiple edges 1306 connecting the nodes. Example social graph 1300 illustrated in FIG. 13 is shown, for didactic purposes, in a two-dimensional visual map representation. In particular embodiments, a networking system 1202, client device 1206, or third-party system 1208 may access social graph 1300 and related social-graph information for suitable applications. The nodes and edges of social graph 1300 may be stored as data objects, for example, in a data store (such as a social-graph database). Such a data store may include one or more searchable or query able indexes of nodes or edges of social graph 1300.

In particular embodiments, a user node 1302 may correspond to a user of networking system 1202. As an example and not by way of limitation, a user may be an individual (human user), an entity (e.g., an enterprise, business, or third-party application), or a group (e.g., of individuals or entities) that interacts or communicates with or over networking system 1202. In particular embodiments, when a user registers for an account with networking system 1202, networking system 1202 may create a user node 1302 corresponding to the user, and store the user node 1302 in one or more data stores. Users and user nodes 1302 described herein may, where appropriate, refer to registered users and user nodes 1302 associated with registered users. In addition or as an alternative, users and user nodes 1302 described herein may, where appropriate, refer to users that have not registered with networking system 1202. In particular embodiments, a user node 1302 may be associated with information provided by a user or information gathered by various systems, including networking system 1202. As an example and not by way of limitation, a user may provide his or her name, profile picture, contact information, birth date, sex, marital status, family status, employment, education background, preferences, interests, or other demographic information. In particular embodiments, a user node 1302 may be associated with one or more data objects corresponding to information associated with a user. In particular embodiments, a user node 1302 may correspond to one or more webpages.

In particular embodiments, a concept node 1304 may correspond to a concept. As an example and not by way of limitation, a concept may correspond to a place (such as, for example, a movie theater, restaurant, landmark, or city); a website (such as, for example, a website associated with networking system 1202 or a third-party website associated with a web-application server); an entity (such as, for example, a person, business, group, sports team, or celebrity); a resource (such as, for example, an audio file, video file, digital photo, text file, structured document, or application) which may be located within networking system 1202 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 1304 may be associated with information of a concept provided by a user or information gathered by various systems, including networking system 1202. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 1304 may be associated with one or more data objects corresponding to information associated with concept node 1304. In particular embodiments, a concept node 1304 may correspond to one or more webpages.

In particular embodiments, a node in social graph 1300 may represent or be represented by a webpage (which may be referred to as a "profile page"). Profile pages may be hosted by or accessible to networking system 1202. Profile pages may also be hosted on third-party websites associated with a third-party system 1208. As an example and not by way of limitation, a profile page corresponding to a particular external webpage may be the particular external webpage and the profile page may correspond to a particular concept node 1304. Profile pages may be viewable by all or a selected subset of other users. As an example and not by way of limitation, a user node 1302 may have a corresponding user-profile page in which the corresponding user may add content, make declarations, or otherwise express himself or herself. As another example and not by way of limitation, a concept node 1304 may have a corresponding concept-profile page in which one or more users may add content, make declarations, or express themselves, particularly in relation to the concept corresponding to concept node 1304.

In particular embodiments, a concept node 1304 may represent a third-party webpage or resource hosted by a third-party system 1208. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client device 1206 to send to networking system 1202 a message indicating the user's action. In response to the message, networking system 1202 may create an edge (e.g., an "eat" edge) between a user node 1302 corresponding to the user and a concept node 1304 corresponding to the third-party webpage or resource and store edge 1306 in one or more data stores.

In particular embodiments, a pair of nodes in social graph 1300 may be connected to each other by one or more edges 1306. An edge 1306 connecting a pair of nodes may represent a relationship between the pair of nodes. In particular embodiments, an edge 1306 may include or represent one or more data objects or attributes corresponding to the relationship between a pair of nodes. As an example and not by way of limitation, a first user may indicate that a second user is a "friend" of the first user. In response to this indication, networking system 1202 may send a "friend request" to the second user. If the second user confirms the "friend request," networking system 1202 may create an edge 1306 connecting the first user's user node 1302 to the second user's user node 1302 in social graph 1300 and store edge 1306 as social-graph information in one or more of data stores. In the example of FIG. 13, social graph 1300 includes an edge 1306 indicating a friend relation between user nodes 1302 of user "A" and user "B" and an edge indicating a friend relation between user nodes 1302 of user "C" and user "B." Although this disclosure describes or illustrates particular edges 1306 with particular attributes connecting particular user nodes 1302, this disclosure contemplates any suitable edges 1306 with any suitable attributes connecting user nodes 1302. As an example and not by way of limitation, an edge 1306 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 1300 by one or more edges 1306.

In particular embodiments, an edge 1306 between a user node 1302 and a concept node 1304 may represent a particular action or activity performed by a user associated with user node 1302 toward a concept associated with a concept node 1304. As an example and not by way of limitation, as illustrated in FIG. 13, a user may "like," "attended," "played," "listened," "cooked," "worked at," or "watched" a concept, each of which may correspond to an edge type or subtype. A concept-profile page corresponding to a concept node 1304 may include, for example, a selectable "check in" icon (such as, for example, a clickable "check in" icon) or a selectable "add to favorites" icon.

Similarly, after a user clicks these icons, networking system 1202 may create a "favorite" edge or a "check in" edge in response to a user's action corresponding to a respective action. As another example and not by way of limitation, a user (user "C") may listen to a particular song ("Ramble On") using a particular application (MUSIC, which is an online music application). In this case, networking system 1202 may create a "listened" edge 1306 and a "used" edge (as illustrated in FIG. 13) between user nodes 1302 corresponding to the user and concept nodes 1304 corresponding to the song and application to indicate that the user listened to the song and used the application. Moreover, networking system 1202 may create a "played" edge 1306 (as illustrated in FIG. 13) between concept nodes 1304 corresponding to the song and the application to indicate that the particular song was played by the particular application. In this case, "played" edge 1306 corresponds to an action performed by an external application (MUSIC) on an external audio file (the song "Imagine"). Although this disclosure describes particular edges 1306 with particular attributes connecting user nodes 1302 and concept nodes 1304, this disclosure contemplates any suitable edges 1306 with any suitable attributes connecting user nodes 1302 and concept nodes 1304. Moreover, although this disclosure describes edges between a user node 1302 and a concept node 1304 representing a single relationship, this disclosure contemplates edges between a user node 1302 and a concept node 1304 representing one or more relationships. As an example and not by way of limitation, an edge 1306 may represent both that a user likes and has used at a particular concept. Alternatively, another edge 1306 may represent each type of relationship (or multiples of a single relationship) between a user node 1302 and a concept node 1304 (as illustrated in FIG. 13 between user node 1302 for user "E" and concept node 1304 for "MUSIC").

In particular embodiments, networking system 1202 may create an edge 1306 between a user node 1302 and a concept node 1304 in social graph 1300. As an example and not by way of limitation, a user viewing a concept-profile page (such as, for example, by using a web browser or a special-purpose application hosted by the user's client device 1206) may indicate that he or she likes the concept represented by the concept node 1304 by clicking or selecting a "Like" icon, which may cause the user's client device 1206 to send to networking system 1202 a message indicating the user's liking of the concept associated with the concept-profile page. In response to the message, networking system 1202 may create an edge 1306 between user node 1302 associated with the user and concept node 1304, as illustrated by "like" edge 1306 between the user and concept node 1304. In particular embodiments, networking system 1202 may store an edge 1306 in one or more data stores. In particular embodiments, an edge 1306 may be automatically formed by networking system 1202 in response to a particular user action. As an example and not by way of limitation, if a first user uploads a picture, watches a movie, or listens to a song, an edge 1306 may be formed between user node 1302 corresponding to the first user and concept nodes 1304 corresponding to those concepts. Although this disclosure describes forming particular edges 1306 in particular manners, this disclosure contemplates forming any suitable edges 1306 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on networking system 1202). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, networking system 1202 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through networking system 1202) or RSVP (e.g., through networking system 1202) to an event associated with the advertisement. In addition or as an alternative, an advertisement may include social-networking-system context directed to the user. As an example and not by way of limitation, an advertisement may display information about a friend of the user within networking system 1202 who has taken an action associated with the subject matter of the advertisement.

In particular embodiments, networking system 1202 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 1208 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, networking system 1202 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part based on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, networking system 1202 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the networking system 1202 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short-or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, networking system 1202 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, networking system 1202 may calculate a coefficient based on a user's actions. Networking system 1202 may monitor such actions on the online social network, on a third-party system 1208, on other suitable systems, or any combination thereof. Any suitable type of user actions may be tracked or monitored. Typical user actions include viewing profile pages, creating or posting content, interacting with content, joining groups, listing and confirming attendance at events, checking-in at locations, liking particular pages, creating pages, and performing other tasks that facilitate social action. In particular embodiments, networking system 1202 may calculate a coefficient based on the user's actions with particular types of content. The content may be associated with the online social network, a third-party system 1208, or another suitable system. The content may include users, profile pages, posts, news stories, headlines, instant messages, chat room conversations, emails, advertisements, pictures, video, music, other suitable objects, or any combination thereof. Networking system 1202 may analyze a user's actions to determine whether one or more of the actions indicate an affinity for subject matter, content, other users, and so forth. As an example and not by way of limitation, if a user may make frequently posts content related to "coffee" or variants thereof, networking system 1202 may determine the user has a high coefficient with respect to the concept "coffee." Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, networking system 1202 may calculate a coefficient based on the type of relationship between particular objects. Referencing the social graph 1300, networking system 1202 may analyze the number and/or type of edges 1306 connecting particular user nodes 1302 and concept nodes 1304 when calculating a coefficient. As an example and not by way of limitation, user nodes 1302 that are connected by a spouse-type edge (representing that the two users are married) may be assigned a higher coefficient than a user node 1302 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, networking system 1202 may determine that the user has a higher coefficient with respect to the first photo than the second photo because having a tagged-in-type relationship with content may be assigned a higher weight and/or rating than having a like-type relationship with content. In particular embodiments, networking system 1202 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, networking system 1202 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 1300. As an example and not by way of limitation, social-graph entities that are closer in the social graph 1300 (i.e., fewer degrees of separation) may have a higher coefficient than entities that are further apart in the social graph 1300.

In particular embodiments, networking system 1202 may calculate a coefficient based on location information. Objects that are geographically closer to each other may be considered to be more related, or of more interest, to each other than more distant objects. In particular embodiments, the coefficient of a user towards a particular object may be based on the proximity of the object's location to a current location associated with the user (or the location of a client device 1206 of the user). A first user may be more interested in other users or concepts that are closer to the first user. As an example and not by way of limitation, if a user is one mile from an airport and two miles from a gas station, networking system 1202 may determine that the user has a higher coefficient for the airport than the gas station based on the proximity of the airport to the user.

In particular embodiments, networking system 1202 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, networking system 1202 may provide information that is relevant to user's interests and current circumstances, increasing the likelihood that they will find such information of interest. In particular embodiments, networking system 1202 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, networking system 1202 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, networking system 1202 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 1208 (e.g., via an API or other communication channel), or from another suitable system. In response to the request, networking system 1202 may calculate the coefficient (or access the coefficient information if it has previously been calculated and stored). In particular embodiments, networking system 1202 may measure an affinity with respect to a particular process. Different processes (both internal and external to the online social network) may request a coefficient for a particular object or set of objects. Networking system 1202 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 1306, U.S. patent application Ser. No. 12/971,2027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 1304 corresponding to a particular photo may have a privacy setting specifying that the photo may only be accessed by users tagged in the photo and their friends. In particular embodiments, privacy settings may allow users to opt in or opt out of having their actions logged by networking system 1202 or shared with other systems (e.g., third-party system 1208). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 1208, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers may be authorization/privacy servers for enforcing privacy settings. In response to a request from a user (or other entity) for a particular object stored in a data store, networking system 1202 may send a request to the data store for the object. The request may identify the user associated with the request and may only be sent to the user (or a client device 1206 of the user) if the authorization server determines that the user is authorized to access the object based on the privacy settings associated with the object. If the requesting user is not authorized to access the object, the authorization server may prevent the requested object from being retrieved from the data store, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
generating an audio memory for a user account of a networking system by:
analyzing a digital video to identify a person in the digital video connected to the user account in a social graph of the networking system;
extracting audio of the person from the digital video; and
storing the audio memory within the networking system in relation to the user account.

2. The computer-implemented method of claim 1, further comprising:
receiving the digital video from a live video capture from a client device of corresponding to user account; and
generating the audio memory based on detecting a user interaction on the client device to request a capture the audio memory, wherein the user interaction comprises a user selection of graphical element to request the audio memory or a voice command input to request the audio memory.

3. The computer-implemented method of claim 2, wherein the client device comprises a smartphone, a head-mounted display, a smart wearable device, or a smart home device.

4. The computer-implemented method of claim 1, further comprising extracting multiple audio sources from the digital video to generate the audio memory with spatial audio.

5. The computer-implemented method of claim 1, further comprising identifying the digital video from digital videos stored in the networking system for the user account.

6. The computer-implemented method of claim 1, further comprising utilizing machine learning to detect persons within digital videos based on voice samples to identify the person in the digital video.

7. The computer-implemented method of claim 6, further comprising identifying the person in the digital video is connected to the user account utilizing social relationship data from the social graph of the networking system between the user account and the identified person.

8. The computer-implemented method of claim 1, further comprising:
analyzing the digital video and the audio from the digital video to determine metadata, wherein the metadata comprises a geolocation, time data, event information, natural language processing transcripts, or user provided tags for the digital video; and
storing the audio memory with the metadata within the networking system.

9. The computer-implemented method of claim 1, further comprising:
identifying one or more suggested audio memories from audio memories stored on the networking system that comprise metadata corresponding to a particular event of the user account; and displaying, within a client device of the user account, the one or more suggested audio memories for the particular event with selectable options to playback the one or more suggested audio memories.

10. The computer-implemented method of claim 1, further comprising enabling a client device of the user account to playback the audio memory utilizing spatial audio by causing the client device to adjust dynamics of audio from the audio memory based on movement of the client device.

11. A non-transitory computer-readable medium storing instructions that, when executed by at least one processor, cause a computing device to:
generate an audio memory for a user account of a networking system by:
analyzing a digital video to identify a person in the digital video connected to the user account in a social graph of the networking system; and
extracting audio of the person from the digital video; and
store the audio memory within the networking system in relation to the user account.

12. The non-transitory computer-readable medium of claim 11, further comprising instructions that, when executed by the at least one processor, cause the computing device to:
receive the digital video from a live video capture from a client device of corresponding to user account; and
generate the audio memory based on detecting a user interaction on the client device to request a capture the audio memory.

13. The non-transitory computer-readable medium of claim 11, further comprising instructions that, when executed by the at least one processor, cause the computing device to extract multiple audio sources from the digital video to generate the audio memory with spatial audio.

14. The non-transitory computer-readable medium of claim 11, further comprising instructions that, when executed by the at least one processor, cause the computing device to identify the digital video from digital videos stored in the networking system for the user account.

15. The non-transitory computer-readable medium of claim 11, further comprising instructions that, when executed by the at least one processor, cause the computing device to utilize machine learning to detect persons within digital videos based on voice samples to identify the person in the digital video.

16. A system comprising:
at least one processor; and
at least one non-transitory computer-readable storage medium storing instructions that, when executed by the at least one processor, cause the system to:
generate an audio memory for a user account of a networking system by:
analyzing a digital video to identify a person in the digital video connected to the user account in a social graph of the networking system; and
extracting audio of the person from the digital video; and
store the audio memory within the networking system in relation to the user account.

17. The system of claim 16, further comprising instructions that, when executed by the at least one processor, cause the system to receive the digital video from a live video capture from a client device of corresponding to user account or identify the digital video from digital videos stored in the networking system for the user account.

18. The system of claim 16, further comprising instructions that, when executed by the at least one processor, cause the system to extract multiple audio sources from the digital video to generate the audio memory with spatial audio.

19. The system of claim 16, further comprising instructions that, when executed by the at least one processor, cause the system to utilize machine learning to detect persons within digital videos based on voice samples to identify the person in the digital video.

20. The system of claim 16, further comprising instructions that, when executed by the at least one processor, cause the system to:
identify one or more suggested audio memories from audio memories stored on the networking system that comprise metadata corresponding to a particular event of the user account; and
display, within a client device of the user account, the one or more suggested audio memories for the particular event with selectable options to playback the one or more suggested audio memories.

* * * * *